(12) United States Patent
Suemitsu et al.

(10) Patent No.: US 12,398,964 B2
(45) Date of Patent: Aug. 26, 2025

(54) RADIATIVE COOLING FILM MATERIAL

(71) Applicant: Osaka Gas Co., Ltd., Osaka (JP)

(72) Inventors: Masahiro Suemitsu, Osaka (JP);
Masayuki Sugimoto, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 217 days.

(21) Appl. No.: 18/283,917

(22) PCT Filed: Mar. 24, 2022

(86) PCT No.: PCT/JP2022/013949
§ 371 (c)(1),
(2) Date: Sep. 25, 2023

(87) PCT Pub. No.: WO2022/202992
PCT Pub. Date: Sep. 29, 2022

(65) Prior Publication Data
US 2024/0167775 A1    May 23, 2024

(30) Foreign Application Priority Data
Mar. 26, 2021  (JP) ................................. 2021-054013

(51) Int. Cl.
*F28F 13/18* (2006.01)
*B32B 7/12* (2006.01)
(Continued)

(52) U.S. Cl.
CPC ............... *F28F 13/18* (2013.01); *B32B 7/12* (2013.01); *B32B 27/22* (2013.01); *B32B 27/304* (2013.01);
(Continued)

(58) Field of Classification Search
CPC ......... B32B 7/12; B32B 12/082; B32B 12/20; B32B 27/08; B32B 27/18; B32B 27/22;
(Continued)

(56) References Cited

U.S. PATENT DOCUMENTS 11,768,041 B2 *  9/2023  Yang ....................... B29C 70/58
                                                          428/323
2017/0248381 A1   8/2017  Yang et al.
(Continued)

FOREIGN PATENT DOCUMENTS

CN      110216924 A    9/2019
CN      111609596 A    9/2020
(Continued)

*Primary Examiner* — Len Tran
*Assistant Examiner* — Hans R Weiland
(74) *Attorney, Agent, or Firm* — The Webb Law Firm

(57) ABSTRACT

The radiative cooling film material includes a film material; and a radiative cooling layer on an outer surface of the film material. The radiative cooling layer includes an infrared radiative layer having a radiative surface for radiating infrared light; and a light reflective layer on a side of the infrared radiative layer, which is opposite to the radiative surface. The infrared radiative layer is a resin material layer including a vinyl chloride resin or a vinylidene chloride resin and having a thickness adjusted so that the resin material layer emits heat radiation energy greater than absorbed solar energy in a wavelength range from 8 μm to 14 μm. The light reflective layer includes silver or a silver alloy, and the radiative cooling film material further includes a film material-side resin layer including a vinyl chloride resin or a vinylidene chloride resin as a rear surface portion of the film material.

19 Claims, 20 Drawing Sheets

(51) Int. Cl.
*B32B 27/22* (2006.01)
*B32B 27/30* (2006.01)
*B32B 27/32* (2006.01)

(52) U.S. Cl.
CPC ........ *B32B 27/32* (2013.01); *B32B 2255/205* (2013.01); *B32B 2307/416* (2013.01); *B32B 2307/7376* (2023.05)

(58) Field of Classification Search
CPC ....... B32B 27/304; B32B 27/32; B32B 27/36; B32B 2255/205; B32B 2307/416; B32B 2307/7376; F28F 13/18
See application file for complete search history.

(56) References Cited

U.S. PATENT DOCUMENTS

| | | | |
|---|---|---|---|
| 2018/0180331 A1* | 6/2018 | Yu | F24S 70/60 |
| 2020/0025425 A1 | 1/2020 | Yu et al. | |
| 2021/0002491 A1 | 1/2021 | Xu et al. | |
| 2021/0011207 A1* | 1/2021 | Yasuda | B32B 7/023 |
| 2021/0262745 A1 | 8/2021 | Suemitsu et al. | |
| 2023/0158786 A1* | 5/2023 | Yang | D06N 3/0036 |
| | | | 428/216 |

FOREIGN PATENT DOCUMENTS

| | | |
|---|---|---|
| JP | 2018526599 A | 9/2018 |
| JP | 2019103465 A | 6/2019 |
| JP | 2019515967 A | 6/2019 |
| JP | 3227268 U | 8/2020 |
| JP | 2020182428 A | 11/2020 |
| WO | 2020195743 A1 | 10/2020 |

* cited by examiner

RADIATIVE COOLING FILM MATERIAL

CROSS-REFERENCE TO RELATED APPLICATIONS

This application is the United States national phase of International Application No. PCT/JP2022/013949 filed Mar. 24, 2022, and claims priority to Japanese Patent Application No. 2021-054013 filed Mar. 26, 2021, the disclosures of which are hereby incorporated by reference in their entireties.

BACKGROUND OF THE INVENTION

Field of the Invention

The present invention relates to a radiative cooling film material having a radiative cooling effect.

Description of Related Art

Radiative cooling is a phenomenon in which the temperature of a substance decreases as a result of the substance radiating electromagnetic waves such as infrared rays to the surrounding environment. By using this phenomenon, it is possible to configure a radiative cooling layer (a radiative cooling device) that cools a cooling target without consuming energy such as electricity, for example.

As a conventional example of a radiative cooling layer (radiative cooling device), there is a radiative cooling layer including: an infrared radiative layer having a radiative surface for radiating infrared light; and a light reflective layer on a side of the infrared radiative layer, which is opposite to the radiative surface. The infrared radiative layer and the light reflective layer are stacked on each other. The infrared radiative layer is formed from a dimethyl siloxane resin, a vinylidene fluoride resin, an acrylic acid resin, or a methyl methacrylate resin, and the light reflective layer includes silver or a silver alloy (see Patent Document 1, for example).

That is, the radiative cooling layer (radiative cooling device) can cool a cooling target even under solar radiation during the day because the infrared radiative layer emits a large heat radiation energy in a wavelength range from 8 μm to 14 μm and the light reflective layer reflects light (ultraviolet light, visible light, infrared light) that has passed through the infrared radiative layer, and causes the light to be radiated from the radiative surface, thus avoiding a situation in which the light (ultraviolet light, visible light, infrared light) that has passed through the infrared radiative layer is projected onto the cooling target and the cooling target is heated.

In addition to light that has passed through the infrared radiative layer, light radiated from the infrared radiative layer toward the light reflective layer is also reflected by the light reflective layer toward the infrared radiative layer, but in the following description, the light reflective layer is described as being provided for the purpose of reflecting light (ultraviolet light, visible light, infrared light) that has passed through the infrared radiative layer.

PATENT DOCUMENTS

Patent Document 1: JP 2018-526599A

SUMMARY OF THE INVENTION

A film material that is used to produce canvas to be used for various applications, such as a warehouse tent, a tent used at an event, a work tent, and a truck tarp provided over a cargo bed of a truck, is desired to suppress an increase in the temperature of the film material under solar radiation during the day.

In the case of a tent used at an event, for example, an event space surrounded by the tent is air-conditioned in summer, and it is desired to suppress an increase in the temperature of the film material as far as possible to reduce the running cost required for air-conditioning.

That is, if an increase in the temperature of the film material is suppressed, an increase in the temperature of the space surrounded by the film material can be suppressed, and therefore, it is desired to suppress an increase in the temperature of the film material as much as possible.

Also, in the production of canvas to be used for a warehouse tent or the like, edge portions of a plurality of film materials are joined, and there is a desire to facilitate joining of the film materials to increase productivity.

The present invention was made in view of the above circumstances, and it is an object thereof to provide a radiative cooling film material that can be cooled under solar radiation during the day due to a radiative cooling effect and can increase the productivity of canvas.

A radiative cooling film material according to the present invention includes:
a film material; and
a radiative cooling layer on an outer surface of the film material,
wherein the radiative cooling layer includes:
an infrared radiative layer having a radiative surface for radiating infrared light; and
a light reflective layer on a side of the infrared radiative layer, which is opposite to the radiative surface,
the infrared radiative layer is a resin material layer including a vinyl chloride resin or a vinylidene chloride resin and having a thickness adjusted so that the resin material layer emits heat radiation energy greater than absorbed solar energy in a wavelength range from 8 μm to 14 μm,
the light reflective layer includes silver or a silver alloy, and
the radiative cooling film material further includes a film material-side resin layer including a vinyl chloride resin or a vinylidene chloride resin as a rear surface portion of the film material, the rear surface portion being apart from the radiative cooling layer.

That is, sunlight incident on the radiative layer of the infrared radiative layer of the radiative cooling layer passes through the resin material layer, and is then reflected by the light reflective layer on a side of the resin material layer, which is the side opposite to the radiative surface, and is released from the radiative surface to the outside of the system.

Note that, in the present specification, when the term light is used alone, the concept of light encompasses ultraviolet light (ultraviolet rays), visible light, and infrared light. When these are described in terms of the wavelength of light, which is electromagnetic waves, light encompasses electromagnetic waves having wavelengths of 10 nm to 20000 nm (electromagnetic waves having wavelengths of 0.01 μm to 20 μm).

Also, heat conducted (input) to the radiative cooling layer is converted to infrared rays in the resin material layer, which is the infrared radiative layer, and released from the radiative surface to the outside of the system.

As described above, the radiative cooling layer can reflect sunlight emitted toward the radiative cooling layer and radiate heat conducted to the radiative cooling layer (e.g., heat conducted from the atmosphere or the film material cooled by the radiative cooling layer) as infrared light to the outside of the system.

Also, the resin material layer has a thickness adjusted so that the resin material layer emits heat radiation energy greater than absorbed solar energy in a wavelength range from 8 μm to 14 μm, and accordingly, the radiative cooling film material can exhibit a cooling function even under solar radiation during the day while sunlight is appropriately reflected by the light reflective layer including silver or a silver alloy.

Therefore, the film material can be cooled by the radiative cooling layer attached to the outer surface of the film material even under solar radiation during the day. Consequently, it is possible to cool the inside of (a space inside) the film material under solar radiation during the day due to a radiative cooling effect.

A thin film of vinyl chloride resin or vinylidene chloride resin softens when a plasticizer is added thereto, and accordingly, even if another object comes into contact with the film, the film flexibly deforms to conform to the object and is kept from being damaged, and therefore, a good appearance of the film can be for a long period of time. Note that a thin film of fluorocarbon resin is hard, and accordingly cannot flexibly deform and is likely to be damaged when another object comes into contact therewith, and therefore, it is difficult to maintain a good appearance of the film.

Moreover, when a plasticizer is added to a vinyl chloride-based resin, the vinyl chloride-based resin deforms when heated to 80° C. or more, and accordingly, even if a scratch is formed in a surface of the film, the scratch disappears and the surface becomes smooth. That is, the film can repair the scratch by itself. The fluorocarbon resin and silicone rubber do not have such characteristics. Owing to the characteristics of the soft vinyl chloride-based resin, a good appearance can be maintained for a long period of time. Consequently, radiative cooling properties can be maintained for a long period of time.

Moreover, the vinyl chloride-based resin is flame retardant and unlikely to undergo biodegradation, and therefore can be preferably used as a resin material to form a resin material layer of a radiative cooling device that is used outdoors.

The vinyl chloride-based resin used in the present invention is a homopolymer of vinyl chloride or vinylidene chloride or a copolymer of vinyl chloride or vinylidene chloride, and produced with use of a conventionally-known polymerization method.

In addition to the vinyl chloride-based resin in the form of a thin film being flexible, the plasticizer is mixed in the vinyl chloride-based resin to soften the vinyl chloride-based resin. Accordingly, the flexibility of the resin material layer is further increased, and consequently the radiative cooling device becomes flexible.

Moreover, in addition to the resin material layer formed from the vinyl chloride resin or the vinylidene chloride resin, the radiative cooling film material includes the film material-side resin layer formed from a vinyl chloride resin or a vinylidene chloride resin as the rear surface portion of the film material apart from the radiative cooling layer. Therefore, it is possible to join a pair of radiative cooling film materials through thermal welding while the film material-side resin layer of one of the radiative cooling film materials is abutted on the resin material layer of the other radiative cooling film material. Accordingly, productivity can be increased in the production of canvas obtained by joining a plurality of radiative cooling film materials.

That is, in the production of canvas to be used for a warehouse tent or the like, edge portions of a plurality of radiative cooling film materials that are formed as rectangular films are joined, for example. If the radiative cooling film materials are joined through sewing, the joining is laborious. However, the radiative cooling film materials can be joined through thermal welding, and therefore, productivity of the canvas can be increased.

Note that examples of the thermal welding include high-frequency welding, hot-air welding, and hot welding.

In short, with the characteristic configuration of the radiative cooling film material according to the present invention, it is possible to provide a radiative cooling film material that can cool the film material under solar radiation during the day due to the radiative cooling effect, and can increase the productivity of canvas.

In a characteristic configuration of the radiative cooling film material according to the present invention, the radiative cooling layer is attached to the outer surface of the film material via a joining layer including an adhesive agent or a pressure-sensitive adhesive agent.

That is, the joining layer formed from an adhesive agent or a pressure-sensitive adhesive agent makes it possible to appropriately attach the radiative cooling layer in close contact with the outer surface of the flexible film material.

Commonly, the outer surface of the film material is not a mirror surface and has irregularities, but the radiative cooling layer is joined to the outer surface of the film material via the joining layer formed from an adhesive agent or a pressure-sensitive adhesive agent, and accordingly, the light reflective layer can be kept flat without being affected by irregularities in the outer surface of the film material.

That is, if the light reflective layer is affected by irregularities in the outer surface of the film material, there arises a problem in that light is scattered by the irregularities in the outer surface of the film material, and consequently, the reflectance of the light reflective layer is reduced and light is absorbed. However, when the light reflective layer is kept flat, it is possible to suppress a reduction in the reflectance of the light reflective layer.

In short, with the characteristic configuration of the radiative cooling film material according to the present invention, it is possible to appropriately attach the radiative cooling layer in close contact with the outer surface of the flexible film material.

In a characteristic configuration of the radiative cooling film material according to the present invention, the thickness of the resin material layer is adjusted so that the resin material layer has:

light absorption properties that allow for a wavelength average absorptivity of 13% or less in a wavelength range from 0.4 μm to 0.5 μm, a wavelength average absorptivity of 4% or less in a wavelength range from 0.5 μm to 0.8 μm, a wavelength average absorptivity of 1% or less in a wavelength range from 0.8 μm to 1.5 μm, and a wavelength average absorptivity of 40% or less in a wavelength range from 1.5 μm to 2.5 μm; and heat radiation properties that allow for a wavelength average emissivity of 40% or more in the wavelength range from 8 μm to 14 μm.

Note that the wavelength average absorptivity in the wavelength range from 0.4 μm to 0.5 μm refers to an average value of absorptivities at respective wavelengths within the range from 0.4 μm to 0.5 μm. The same applies to the wavelength average absorptivity in the wavelength range from 0.5 µm to 0.8 µm, the wavelength average absorptivity in the wavelength range from 0.8 µm to 1.5 µm, and the wavelength average absorptivity in the wavelength range from 1.5 µm to 2.5 µm. Also, similar descriptions including the description of emissivity refer to similar average values, and this applies to the following description of the present specification.

That is, the absorptivity and the emissivity (light emissivity) of the resin material layer vary according to the thickness of the resin material layer. Therefore, the thickness of the resin material layer needs to be adjusted in such a manner that the resin material layer does not absorb sunlight as far as possible and radiates a large amount of heat in the wavelength band of so-called atmospheric window (light wavelength range from 8 µm to 20 µm).

Specifically, from the viewpoint of absorptivity (light absorption properties) of the resin material layer for sunlight, the wavelength average absorptivity in the wavelength range from 0.4 µm to 0.5 µm needs to be 13% or less, the wavelength average absorptivity in the wavelength range from 0.5 µm to 0.8 µm needs to be 4% or less, the wavelength average absorptivity in the wavelength range from 0.8 µm to 1.5 µm needs to be 1% or less, and the wavelength average absorptivity in the wavelength range from 1.5 µm to 2.5 µm needs to be 40% or less. Note that a wavelength average absorptivity in a wavelength range from 2.5 µm to 4 µm may be 100% or less.

In the case of such an absorptivity distribution, the absorptivity for sunlight is 10% or less, which corresponds to an energy of 100 W or less.

The absorptivity for sunlight increases as the film thickness of the resin material layer is increased. When the resin material layer is made thick, the emissivity in the atmospheric window becomes approximately 1, and the amount of heat radiated toward the universe at that time is 125 W/m$^2$ to 160 W/m$^2$.

As described above, the amount of sunlight absorbed by the light reflective layer is preferably 50 W/m$^2$ or less.

Accordingly, cooling progresses if the sum of amounts of sunlight absorbed by the resin material layer and the light reflective layer is 150 W/m$^2$ or less and the atmosphere is in good conditions. It is preferable to use a resin material layer that has a small absorptivity in the vicinity of a peak value of the sunlight spectrum as described above.

Also, from the viewpoint of infrared radiation (heat radiation properties) of the resin material layer, the wavelength average emissivity in the wavelength range from 8 µm to 14 µm needs to be 40% or more.

That is, in order to emit heat of about 50 W/m$^2$ absorbed from sunlight by the light reflective layer to the universe from the resin material layer, the resin material layer needs to radiate heat more than or equal to the absorbed heat.

For example, when the ambient temperature is 30° C., the maximum heat radiation in the atmospheric window of the wavelength range from 8 µm to 14 µm is 200 W/m$^2$ (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling film material is actually used in a humid environment, and the atmospheric window becomes narrower in such a case as well. When the radiative cooling film material is used in a lowland, heat radiation in the atmospheric window band is estimated to be 160 W/m$^2$ (calculated with the emissivity taken as 1) at 30° C. under good conditions.

Moreover, when there is haze or smog in the sky, as is often the case in Japan, the atmospheric window further becomes narrower and radiation to the universe becomes about 125 W/m$^2$.

In view of the foregoing, the radiative cooling film material cannot be used in a lowland in the mid-latitude area unless the wavelength average emissivity in the wavelength range from 8 µm to 14 µm is 40% or more (heat radiation intensity in the atmospheric window band is 50 W/m$^2$ or more).

Therefore, when the thickness of the resin material layer is adjusted so as to fall within the range of optical prescriptions described above, the amount of heat output in the atmospheric window becomes greater than the amount of heat input through absorption of sunlight, and radiative cooling can be performed in an outdoor environment even under solar radiation during the day.

That is, in the case where the resin material layer is formed from a vinyl chloride resin or a vinylidene chloride resin, the thickness of the resin material layer is preferably 10 µm or more and 100 µm or less.

In short, with the above-described characteristic configuration of the radiative cooling film material according to the present invention, the amount of heat output in the atmospheric window becomes greater than the amount of heat input through absorption of sunlight, and radiative cooling can be performed in an outdoor environment even under solar radiation.

In a characteristic configuration of the radiative cooling film material according to the present invention, the light reflective layer has a reflectance of 90% or more in a wavelength range from 0.4 µm to 0.5 µm, and a reflectance of 96% or more with respect to light having a wavelength longer than 0.5 µm.

The spectrum of sunlight spans from a wavelength of 0.295 µm to a wavelength of 4 µm, and the intensity increases as the wavelength increases from 0.4 µm, and the intensity is particularly high in a wavelength range from 0.5 µm to 2.5 µm.

When the light reflective layer has reflective properties that allow for a reflectance of 90% or more in the wavelength range from 0.4 µm to 0.5 µm and a reflectance of 96% or more for light having a wavelength longer than 0.5 µm, solar energy absorbed by the light reflective layer is as small as about 5% or less.

Consequently, solar energy absorbed by the light reflective layer at the time of meridian transit in summer can be suppressed to about 50 W/m$^2$ or less, and the resin material layer can favorably perform radiative cooling.

Note that, in the present specification, the spectrum of sunlight is in accordance with the standard of AM1.5G, unless otherwise stated.

In short, with the above-described characteristic configuration of the radiative cooling film material according to the present invention, it is possible to suppress absorption of solar energy by the light reflective layer and allow the resin material layer to favorably perform radiative cooling.

In a characteristic configuration of the radiative cooling film material according to the present invention, the light reflective layer includes silver or a silver alloy, and has a thickness of 50 nm or more.

In order to make the light reflective layer have the reflective properties described above, i.e., a reflectance of 90% or more in the wavelength range from 0.4 μm to 0.5 μm and a reflectance of 96% or more for light having a wavelength longer than 0.5 μm, silver or a silver alloy needs to be used as a reflective material that constitutes the radiative surface side portion of the light reflective layer.

In a case where sunlight is to be reflected only by silver or a silver alloy in such a manner as to satisfy the reflective properties described above, a thickness of 50 nm or more is required.

In short, with the above-described characteristic configuration of the radiative cooling film material according to the present invention, it is possible to appropriately suppress absorption of solar energy by the light reflective layer and allow the resin material layer to favorably perform radiative cooling.

In a characteristic configuration of the radiative cooling film material according to the present invention, the light reflective layer has a layered structure including (i) silver or a silver alloy adjacent to the resin material layer and (ii) aluminum or an aluminum alloy apart from the resin material layer.

That is, in order to make the light reflective layer have the reflectance characteristics described above, it is also possible to adopt a layered structure including silver or a silver alloy and aluminum or an aluminum alloy. In this case as well, it is necessary to use silver or a silver alloy as the reflective material on the radiative surface side. In this case, the thickness of silver needs to be 10 nm or more, and the thickness of aluminum needs to be 30 nm or more.

Since aluminum or an aluminum alloy is inexpensive compared with silver or a silver alloy, it is possible to reduce the cost of the light reflective layer while making the light reflective layer have appropriate reflectance characteristics.

That is, when the layered structure including silver or a silver alloy and aluminum or an aluminum alloy is adopted for the light reflective layer and the thickness of silver or the silver alloy, which is expensive, is reduced to reduce the cost of the light reflective layer, it is possible to reduce the cost of the light reflective layer while making the light reflective layer have appropriate reflectance characteristics.

In short, with the characteristic configuration of the radiative cooling film material according to the present invention, it is possible to reduce the cost of the light reflective layer while making the light reflective layer have appropriate reflectance characteristics.

In a characteristic configuration of the radiative cooling film material according to the present invention, the resin material layer includes a vinyl chloride-based resin as a resin material in which a plasticizer is mixed, and the plasticizer is at least one compound selected from the group consisting of phthalic acid esters, aliphatic dibasic acid esters, and phosphoric acid esters.

That is, sufficient heat radiation can be obtained in the atmospheric window range with use of a vinyl chloride-based resin. Heat radiation properties of the vinyl chloride-based resin are equivalent to those of a fluorocarbon resin and silicone rubber with which a large amount of heat radiation can be obtained in the atmospheric window range, and the vinyl chloride-based resin is far more inexpensive than these resins, and therefore is effective to produce, at a low cost, a radiative cooling device whose temperature falls below the ambient temperature in direct sunlight. Note that when the resin material layer is formed from the vinyl chloride-based resin, the thickness of the resin material layer is preferably 10 μm or more and 100 μm or less as described above.

Furthermore, a thin film of vinyl chloride-based resin softens when a plasticizer is added thereto, and accordingly, even if another object comes into contact with the film, the film flexibly deforms to conform to the object and is kept from being damaged, and therefore, a good appearance of the film can be maintained for a long period of time. Note that a thin film of fluorocarbon resin is hard, and accordingly cannot flexibly deform and is likely to be damaged when another object comes into contact therewith, and therefore, it is difficult to maintain a good appearance of the film.

Moreover, when a plasticizer is added to the vinyl chloride-based resin, the vinyl chloride-based resin deforms when heated to 80° C. or more, and accordingly, even if a scratch is formed in a surface of the film, the scratch disappears and the surface becomes smooth. That is, the film can repair the scratch by itself. The fluorocarbon resin and silicone rubber do not have such characteristics. Owing to the characteristics of the soft vinyl chloride-based resin, a good appearance can be maintained for a long period of time. Consequently, radiative cooling properties can be maintained for a long period of time.

Moreover, the plasticizer mixed in the vinyl chloride-based resin is at least one compound selected from the group consisting of phthalic acid esters, aliphatic dibasic acid esters, and phosphoric acid esters, and accordingly, the plasticizer is unlikely to absorb ultraviolet rays (ultraviolet light in a wavelength range from 295 nm to 400 nm) included in sunlight, and therefore, the weather resistance of the vinyl chloride-based resin in which the plasticizer is mixed can be increased.

That is, if the plasticizer mixed in the vinyl chloride-based resin absorbs ultraviolet rays, there is a risk that hydrolysis of the plasticizer will progress, and consequently, the vinyl chloride-based resin will be colored (to brown) as a result of dehydrochlorination or the like, and mechanical strength will decrease. However, the plasticizer is not likely to absorb ultraviolet rays included in sunlight, and therefore, it is possible to increase the weather resistance of the vinyl chloride-based resin in which the plasticizer is mixed.

Note that a plasticizer is preferably mixed in the film material-side resin layer formed as the rear surface portion of the film material. In this case, it is possible to suppress absorption of ultraviolet rays by the plasticizer mixed in the film material-side resin layer by mixing an ultraviolet absorbing agent in the film material-side resin layer or coloring the film material-side resin layer so as to facilitate absorption of ultraviolet rays, for example. Therefore, it is possible to use, as the plasticizer mixed in the film material-side resin layer, trimellitic acid esters (TOTM) and epoxidized aliphatic acid esters (epoxidized soybean oil) as well as phthalic acid esters, aliphatic dibasic acid esters, and phosphoric acid esters.

In short, with the characteristic configuration of the radiative cooling film material according to the present invention, it is possible to provide a radiative cooling film material that has sufficient flexibility and increased weather resistance while reducing the cost.

In a characteristic configuration of the radiative cooling film material according to the present invention, the plasticizer is mixed in an amount of 1 part by weight or more and 200 parts by weight or less relative to 100 parts by weight of the vinyl chloride resin or the vinylidene chloride resin.

That is, the plasticizer is mixed in an amount of 1 part by weight or more and 200 parts by weight or less relative to 100 parts by weight of the vinyl chloride-based resin, and accordingly, it is possible to impart adequate flexibility to the vinyl chloride-based resin.

In a characteristic configuration of the radiative cooling film material according to the present invention, the plasticizer includes a phosphoric acid ester that is a phosphoric acid triester or an aromatic phosphoric acid ester.

That is, by using a phosphoric acid triester or an aromatic phosphoric acid ester as a phosphoric acid ester that serves as the plasticizer, it is possible to appropriately keep the plasticizer from absorbing ultraviolet rays included in sunlight.

In a characteristic configuration of the radiative cooling film material according to the present invention, the radiative cooling film material further includes a protective layer between the infrared radiative layer and the light reflective layer, and the protective layer includes a polyolefin resin and has a thickness of 300 nm or more and 40 μm or less, or includes a polyethylene terephthalate resin and has a thickness of 17 μm or more and 40 μm or less.

That is, sunlight incident on the radiative surface of the resin material layer, which is the infrared radiative layer, passes through the resin material layer and the protective layer, and is then reflected by the light reflective layer on a side of the resin material layer, which is opposite to the radiative surface, and released from the radiative surface to the outside of the system.

The protective layer is formed from a polyolefin resin with a thickness of 300 nm or more and 40 μm or less, or an ethylene terephthalate resin with a thickness of 17 μm or more and 40 μm or less, and accordingly, the protective layer suppresses discoloration of silver or a silver alloy included in the light reflective layer even under solar radiation during the day, and accordingly, the radiative cooling film material can exhibit a cooling function even under solar radiation during the day while sunlight is appropriately reflected by the light reflective layer.

In a case where the protective layer is not provided, there is a risk of the light reflective layer failing to appropriately exhibit its light reflecting function as a result of silver or a silver alloy included in the light reflective layer being discolored in a short period of time due to radicals generated in the resin material layer reaching silver or the silver alloy included in the light reflective layer or moisture that has permeated through the resin material layer reaching silver or the silver alloy included in the light reflective layer. However, when the protective layer is provided, it is possible to keep silver or the silver alloy included in the light reflective layer from being discolored in a short period of time.

The following is an additional description of suppression of discoloration of silver or a silver alloy included in the light reflective layer by the protective layer.

In the case where the protective layer is formed from a polyolefin resin with a thickness of 300 nm or more and 40 μm or less, the protective layer is unlikely to deteriorate by absorbing ultraviolet rays because the polyolefin resin is a synthetic resin that has an absorptivity of 10% or less for ultraviolet rays over the entire wavelength range of ultraviolet rays from 0.295 μm to 0.4 μm.

Moreover, since the thickness of the polyolefin resin forming the protective layer is 300 nm or more, the protective layer favorably exhibits a blocking function of blocking radicals generated in the resin material layer to keep the radicals from reaching silver or the silver alloy included in the light reflective layer and blocking moisture that has permeated through the resin material layer to keep the moisture from reaching silver or the silver alloy included in the light reflective layer, and thus discoloration of silver or the silver alloy included in the light reflective layer can be suppressed.

That is, when ultraviolet rays are absorbed by the protective layer formed from the polyolefin resin, the protective layer deteriorates while forming radicals on the side of its surface apart from the light reflective layer, but the generated radicals do not reach the light reflective layer because the protective layer has a thickness of 300 nm or more. Also, although the protective layer deteriorates while forming radicals, the progress of deterioration is slow because absorption of ultraviolet rays is low, and therefore, the protective layer exhibits the above-described blocking function for a long period of time.

In the case where the protective layer is formed from an ethylene terephthalate resin with a thickness of 17 μm or more and 40 μm or less, the ethylene terephthalate resin is a resin material that has a higher absorptivity for ultraviolet rays than the polyolefin resin in the wavelength range of ultraviolet rays from 0.295 μm to 0.4 μm. However, the protective layer has a thickness of 17 μm or more, and accordingly, the protective layer favorably exhibits the blocking function of blocking radicals generated in the resin material layer to keep the radicals from reaching silver or the silver alloy included in the light reflective layer and blocking moisture that has permeated through the resin material layer to keep the moisture from reaching silver or the silver alloy included in the light reflective layer for a long period of time, and thus discoloration of silver or the silver alloy included in the protective layer can be suppressed.

That is, the protective layer formed from the ethylene terephthalate resin deteriorates by absorbing ultraviolet rays while forming radicals on the side of its surface apart from the light reflective layer, but the generated radicals do not reach the light reflective layer because the protective layer has a thickness of 17 μm or more. Also, although the protective layer deteriorates while forming radicals, the protective layer exhibits the blocking function for a long period of time because the thickness is 17 μm or more.

Note that the upper limit value of the thickness of the protective layer is set for the cases where the protective layer is formed from the polyolefin resin or the ethylene terephthalate resin in order to avoid a situation in which the protective layer exhibits thermal insulation properties, which do not contribute to radiative cooling, as far as possible. That is, as the thickness of the protective layer is increased, the protective layer exhibits thermal insulation properties, which do not contribute to radiative cooling, and therefore, the upper limit value of the thickness is set to prevent the protective layer from exhibiting thermal insulation properties, which do not contribute to radiative cooling, as far as possible while allowing the protective layer to exhibit the function of protecting the light reflective layer.

In short, with the above-described characteristic configuration of the radiative cooling film material according to the present invention, it is possible to provide a radiative cooling film material that can favorably cool the inside of the film material while suppressing discoloration of silver or a silver alloy included in the light reflective layer in a short period of time.

In a characteristic configuration of the radiative cooling film material according to the present invention, the radiative cooling film material further includes an adhesive layer between the resin material layer and the protective layer, the adhesive layer joining the resin material layer to the protective layer.

In the case where the adhesive layer joining the resin material layer to the protective layer is provided between the infrared radiative layer and the protective layer, the state where the resin material layer, the protective layer, and the light reflective layer are stacked on one another can be obtained by forming the light reflective layer and the protective layer in a layered manner and joining the resin material layer, which has been separately formed, to the protective layer with use of the adhesive layer. That is, it is possible to favorably produce the radiative cooling layer.

In the case where the adhesive layer is provided between the resin material layer and the protective layer, radicals are generated in the adhesive layer as well, but the protective layer keeps the radicals generated in the adhesive layer from reaching the light reflective layer.

In short, with the characteristic configuration of the radiative cooling film material according to the present invention, it is possible to favorably produce the radiative cooling layer.

In a characteristic configuration of the radiative cooling film material according to the present invention, the adhesive layer includes a urethane adhesive agent, a urethane pressure-sensitive adhesive agent, an acrylic adhesive agent, an acrylic pressure-sensitive adhesive agent, an ethylene vinyl acetate adhesive agent, or an ethylene vinyl acetate pressure-sensitive adhesive agent.

That is, the adhesive layer is formed from a urethane adhesive agent, a urethane pressure-sensitive adhesive agent, an acrylic adhesive agent, an acrylic pressure-sensitive adhesive agent, an ethylene vinyl acetate adhesive agent, or an ethylene vinyl acetate pressure-sensitive adhesive agent, and these adhesive agents and pressure-sensitive adhesive agents are highly transparent to sunlight.

That is, although the radiative cooling film material includes the adhesive layer, the radiative cooling film material can appropriately exhibit the radiative cooling effect.

In a characteristic configuration of the radiative cooling film material according to the present invention, the resin material layer includes a filler made of an inorganic material.

That is, a filler made of an inorganic material is mixed in the resin material layer, and accordingly, the radiative cooling film material appears white as viewed from the radiative surface side due to a light scattering effect of the inorganic filler, and the appearance of the radiative cooling film material can be improved.

If the inorganic filler is not mixed in the resin material layer, the light reflective layer is visible through the transparent resin material layer, and accordingly, silver of the light reflective layer is visible. However, owing to the light scattering effect of the inorganic filler, the radiative cooling film material appears white as viewed from the radiative surface side, and the appearance of the radiative cooling film material can be improved.

In short, with the characteristic configuration of the radiative cooling film material according to the present invention, it is possible to make the radiative cooling film material appear white as viewed from the radiative surface side.

In a characteristic configuration of the radiative cooling film material according to the present invention, the adhesive layer includes a filler made of an inorganic material.

That is, an inorganic filler is mixed in the adhesive layer joining the resin material layer to the protective layer. Since the adhesive layer is protected by the resin material layer, moisture included in air and rain is kept from permeating through the adhesive layer, and the inorganic filler mixed in the adhesive layer is kept from being affected by moisture included in air and rain. Consequently, the radiative cooling layer can be kept from deteriorating early, and can have increased durability.

Moreover, in the case where the inorganic filler is mixed in the adhesive layer, which joins the resin material layer to the protective layer, the inorganic filler mixed in the adhesive layer is visible through the transparent resin material layer when the radiative cooling layer is viewed from the radiative surface side, and therefore, the radiative cooling film material appears white as viewed from the radiative surface side due to the light scattering effect of the inorganic filler, and the appearance of the radiative cooling film material can be improved.

In short, with the characteristic configuration of the radiative cooling film material according to the present invention, it is possible to increase durability of the radiative cooling film material while making the radiative cooling film material appear white as viewed from the radiative surface side.

In a characteristic configuration of the radiative cooling film material according to the present invention, the filler is included in an amount of 0.1 to 40 wt % relative to the adhesive layer.

That is, the amount of filler relative to the adhesive layer is 0.1 to 40 wt %, and accordingly, it is possible to appropriately make the radiative cooling film material appear white as viewed from the radiative surface side.

In a characteristic configuration of the radiative cooling film material according to the present invention, the filler includes any one selected from the group consisting of silicon dioxide, titanium oxide, aluminum oxide, magnesium oxide, and calcium carbonate.

That is, the filler includes any one selected from the group consisting of silicon dioxide, titanium oxide, aluminum oxide, magnesium oxide, and calcium carbonate, and accordingly, it is possible to appropriately make the radiative cooling film material appear white as viewed from the radiative surface side.

In a characteristic configuration of the radiative cooling film material according to the present invention, the filler includes titanium oxide.

That is, titanium oxide that does not exhibit photocatalytic activity is used, and therefore, it is possible to appropriately suppress deterioration of the resin material layer adjacent to the adhesive layer due to the filler mixed in the adhesive layer.

In a characteristic configuration of the radiative cooling film material according to the present invention, the titanium oxide is provided with at least one of an alumina coating, a silica coating, and a zirconia coating.

That is, it is possible to appropriately keep the filler from exhibiting photocatalytic activity by providing the titanium oxide with at least one of an alumina coating, a silica coating, and a zirconia coating, and accordingly, it is possible to more appropriately suppress deterioration of the resin material layer adjacent to the adhesive layer.

In a characteristic configuration of the radiative cooling film material according to the present invention, the radiative surface has irregularities.

That is, it is possible to increase the surface area of the radiative surface by forming irregularities in the radiative surface, and consequently, the cooling function can be improved due to ambient air flowing through the irregularities in the radiative surface, for example.

In short, with the characteristic configuration of the radiative cooling film material according to the present invention, it is possible to improve the cooling function.

DESCRIPTION OF THE INVENTION

The following describes an embodiment of the present invention based on the drawings.

[Basic Configuration of Radiative Cooling Film Material]

Figure 1:
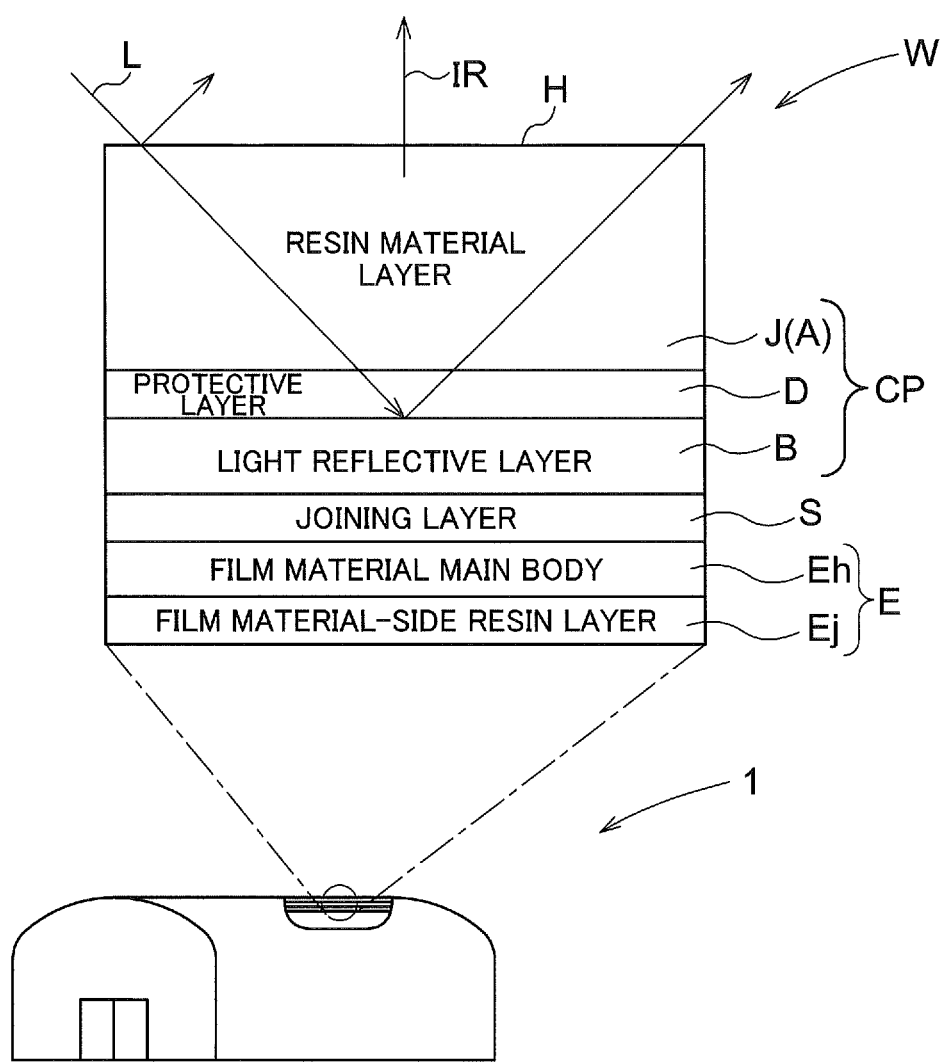
FIG. 1 is a diagram showing a basic configuration of a radiative cooling film material.

As shown in FIG. 1, a radiative cooling film material W includes a film material E and a film-shaped radiative cooling layer CP attached to an outer surface of the film material E, and is configured to cool the film material E by a radiative cooling effect of the radiative cooling layer CP. The radiative cooling layer CP shown in FIG. 1 is joined to the outer surface of the film material E by a joining layer S formed from an adhesive agent or a pressure-sensitive adhesive agent.

FIG. 1 shows a case where a warehouse tent 1 is formed from the radiative cooling film material W. That is, an upper surface portion of the warehouse tent 1 and a side surface portion surrounding the upper surface portion are formed from canvas obtained by joining a plurality of radiative cooling film materials W. A configuration for joining the plurality of radiative cooling film materials W will be described later.

The radiative cooling layer CP includes: an infrared radiative layer A having a radiative surface H for radiating infrared light IR; a light reflective layer B on a side of the infrared radiative layer A, which is the side opposite to the radiative surface H; and a protective layer D between the infrared radiative layer A and the light reflective layer B. The radiative cooling layer CP is in the form of a film obtained by stacking the infrared radiative layer A, the light reflective layer B, and the protective layer D on one another.

That is, the radiative cooling layer CP is configured as a radiative cooling film.

The light reflective layer B reflects light L, such as sunlight, that has passed through the infrared radiative layer A and the protective layer D, and has reflective properties that allow for a reflectance of 90% or more in a wavelength range from 400 nm to 500 nm and a reflectance of 96% or more for light having a wavelength longer than 500 nm.

The spectrum of sunlight spans from a wavelength of 300 nm to a wavelength of 4000 nm, and the intensity increases as the wavelength increases from 400 nm, and the intensity is particularly high in a wavelength range from 500 nm to 1800 nm.

In the present embodiment, light L encompasses ultraviolet light (ultraviolet rays), visible light, and infrared light. When these are described in terms of the wavelength of light, which is electromagnetic waves, the light L encompasses electromagnetic waves having wavelengths of 10 nm to 20000 nm (electromagnetic waves having wavelengths of 0.01 μm to 20 μm). In the present specification, the wavelength range of ultraviolet light (ultraviolet rays) is taken as a range from 295 nm to 400 nm.

Since the light reflective layer B exhibits the reflective properties that allow for a reflectance of 90% or more in the wavelength range from 400 nm to 500 nm and a reflectance of 96% or more for light having a wavelength longer than 500 nm, solar energy absorbed by the light reflective layer B of the radiative cooling layer CP (radiative cooling film) can be suppressed to 5% or less. That is, solar energy absorbed at the time of meridian transit in summer can be suppressed to about 50 W.

The light reflective layer B is constituted by silver or a silver alloy or has a layered structure constituted by (i) silver or a silver alloy adjacent to the protective layer D and (ii) aluminum or an aluminum alloy apart from the protective layer D. The light reflective layer B is flexible. Details of the light reflective layer B will be described later.

The infrared radiative layer A is configured as a resin material layer J formed form a vinyl chloride resin or a vinylidene chloride resin with a thickness adjusted so that the resin material layer J emits heat radiation energy greater than absorbed solar energy in a wavelength range from 8 µm to 14 µm. Details of the infrared radiative layer A will be described later.

Accordingly, the radiative cooling layer CP is configured such that the radiative surface H of the infrared radiative layer A reflects a portion of light L incident on the radiative cooling layer CP, and the light reflective layer B reflects a portion (e.g., sunlight) of light L incident on the radiative cooling layer CP and transmitted through the resin material layer J and the protective layer D so that the reflected light goes out from the radiative surface H to the outside.

The radiative cooling layer CP is also configured to cool the film material E on the side of the light reflective layer B, which is opposite to the resin material layer J, by converting heat input from the film material E (e.g., heat conducted from the film material E) to the radiative cooling layer CP to infrared light IR in the resin material layer J and radiating the infrared light IR.

That is, the radiative cooling layer CP is configured to reflect light L emitted toward the radiative cooling layer CP and radiate heat conducted to the radiative cooling layer CP (e.g., heat conducted from the atmosphere or the film material E) as infrared light IR to the outside.

Also, the radiative cooling layer CP (radiative cooling film) is configured to be flexible due to the resin material layer J, the protective layer D, and the light reflective layer B being flexible.

The radiative cooling film material includes a film material-side resin layer Ej formed from a vinyl chloride resin or a vinylidene chloride resin, serving as a rear surface portion of the film material E, which is apart from the radiative cooling layer CP.

That is, the film material E is constituted by a film material main body Eh and the film material-side resin layer Ej stacked on each other.

Examples of the film material main body Eh include fabric made of natural fiber such as cotton or hemp, fabric made of inorganic fiber, synthetic fiber, or special fiber, and nonwoven cloth such as spun bond, spun lace, or needle punch. The film material main body Eh has a thickness of about 0.1 mm to 5 mm, for example.

Examples of inorganic fibers include metal fiber and glass fiber. Examples of synthetic fibers include polyamide fiber, polyester fiber, polyacrylonitrile fiber, polyvinylalcohol fiber, polypropylene fiber, and polyethylene fiber. Examples of special fibers include aramid fiber, carbon fiber, and biodegradable fiber.

[Outline of Resin Material Layer]

The absorptivity and the emissivity (light emissivity) of the resin material forming the resin material layer J vary according to the thickness of the resin material layer. Therefore, the thickness of the resin material layer J needs to be adjusted in such a manner that the resin material layer does not absorb sunlight as far as possible and radiates a large amount of heat in the wavelength band of so-called atmospheric window (light wavelength range from 8 µm to 14 µm).

Specifically, from the viewpoint of absorptivity for sunlight, the thickness of the resin material layer J needs to be adjusted in such a manner that a wavelength average absorptivity in a wavelength range from 0.4 µm to 0.5 µm is 13% or less, a wavelength average absorptivity in a wavelength range from 0.5 µm to 0.8 µm is 4% or less, a wavelength average absorptivity in a wavelength range from 0.8 µm to 1.5 µm is 1% or less, a wavelength average absorptivity in a wavelength range from 1.5 µm to 2.5 µm is 40% or less, and a wavelength average absorptivity in a wavelength range from 2.5 µm to 4 µm is 100% or less.

In the case of such an absorptivity distribution, the absorptivity for sunlight is 10% or less, which corresponds to an energy of 100 W or less.

The absorptivity of the resin material increases as the film thickness of the resin material is increased as described later. When the film thickness of the resin material is made large, the emissivity in the atmospheric window becomes approximately 1, and the amount of heat radiated toward the universe at that time is 125 W/m² to 160 W/m². The amount of sunlight absorbed by the protective layer D and the light reflective layer B is 50 W/m² or less. Cooling progresses if the sum of amounts of sunlight absorbed by the resin material layer J, the protective layer D, and the light reflective layer B is 150 W/m² or less and the atmosphere is in good conditions. It is preferable to use a resin material that has a small absorptivity in the vicinity of a peak value of the sunlight spectrum as described above as the resin material of the resin material layer J.

Also, from the viewpoint of infrared radiation (heat radiation), the thickness of the resin material layer J needs to be adjusted in such a manner that a wavelength average emissivity in the wavelength range from 8 µm to 14 µm is 40% or more.

In order to emit heat energy of about 50 W/m² absorbed from sunlight by the protective layer D and the light reflective layer B to the universe from the resin material layer J through heat radiation from the resin material layer, the resin material layer J needs to radiate heat more than or equal to the absorbed heat.

For example, when the ambient temperature is 30° C., the maximum heat radiation in the atmospheric window of the wavelength range from 8 µm to 14 µm is 200 W/m² (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling layer CP (radiative cooling film) is actually used in a humid environment, and the atmospheric window becomes narrower in such a case as well. When the radiative cooling film material is used in a lowland, heat radiation in the atmospheric window band is estimated to be 160 W/m² (calculated with the emissivity taken as 1) at 30° C. under good conditions. Moreover, when there is haze or smog in the sky, as is often the case in Japan, the atmospheric window further becomes narrower and radiation to the universe becomes about 125 W/m².

In view of the foregoing, the radiative cooling film material cannot be used in a lowland in the mid-latitude area unless the wavelength average emissivity in the wavelength range from 8 µm to 14 µm is 40% or more (heat radiation intensity in the atmospheric window band is 50 W/m² or more).

Therefore, when the thickness of the resin material layer J is adjusted so as to fall within the range of optical prescriptions defined in view of the above circumstances, the amount of heat output in the atmospheric window becomes greater than the amount of heat input through absorption of sunlight, and radiative cooling can be performed in an outdoor environment even under solar radiation.

In the present embodiment, the thickness of the vinyl chloride resin or the vinylidene chloride resin forming the resin material layer J is 10 μm or more and 100 μm or less.

[Details of Resin Material]

According to Kirchhoff's law, the emissivity (ε) is equal to the absorptivity (A). The absorptivity can be calculated from an absorption coefficient (α) and the following relational expression (hereinafter may be referred to as an absorptivity relational expression) where t represents the film thickness.

$$A=1-\exp(-\alpha t)$$

That is, by adjusting the film thickness of the resin material layer J, it is possible to obtain a large amount of heat radiation in a wavelength band in which the absorption coefficient is large. In a case where radiative cooling is performed outdoors, it is preferable to use a material that has a large absorption coefficient in the wavelength band of the atmospheric window, which is from 8 μm to 14 μm.

Also, in order to suppress absorption of sunlight, it is preferable to use a material that does not have an absorption coefficient or has a small absorption coefficient in a wavelength range from 0.3 μm to 4 μm, and particularly from 0.4 μm to 2.5 μm. As can be understood from the relational expression of the absorption coefficient and the absorptivity, the absorptivity (emissivity) varies according to the film thickness of the resin material.

In order to make the temperature lower than the temperature of the surrounding atmosphere through radiative cooling under solar radiation, it is possible to create a state in which almost no sunlight is absorbed but a large amount of heat is radiated in the atmospheric window, i.e., output of radiative cooling is greater than input of sunlight, by selecting a material that has a large absorption coefficient in the wavelength band of the atmospheric window and almost no absorption coefficient in the wavelength band of sunlight and by adjusting the film thickness.

The sunlight spectrum includes only wavelengths longer than or equal to 0.295 μm. Note that ultraviolet rays are defined as light having a wavelength shorter than 0.4 μm, visible rays are defined as light in a wavelength range from 0.4 μm to 0.8 μm, near-infrared rays are defined as light in a wavelength range from 0.8 μm to 3 μm, mid-infrared rays are defined as light in a wavelength range from 3 μm to 8 μm, and far-infrared rays are defined as light having a wavelength longer than 8 μm.

As for a carbon-chlorine bond (C—Cl), bond energy between carbon and chlorine in an alkene is 3.28 eV, which corresponds to a wavelength of 0.378 μm, and therefore, ultraviolet rays in sunlight are absorbed well, but almost no light in the visible range is absorbed.

Figure 2:
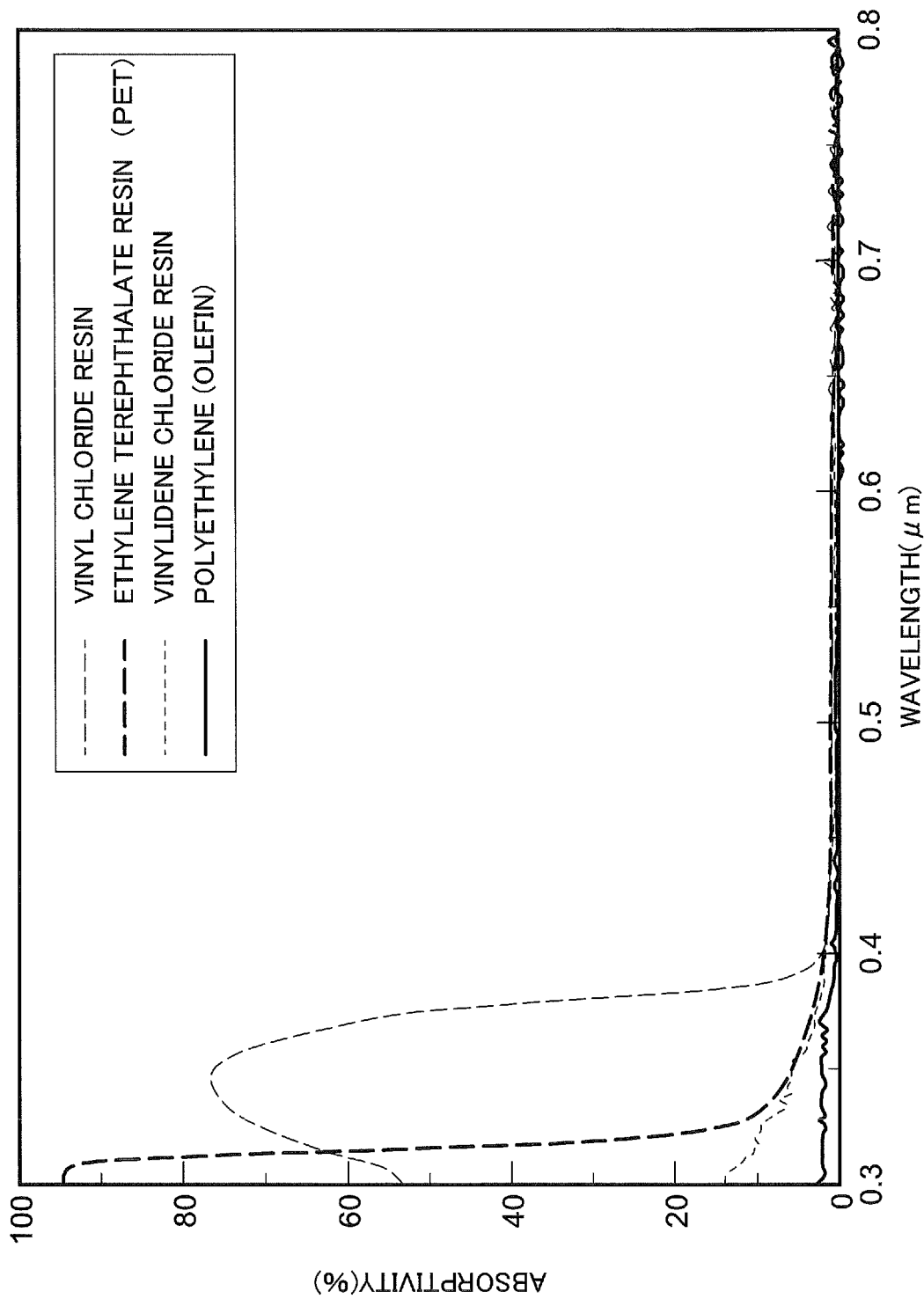
FIG. 2 is a diagram showing a relationship between absorptivities of resin materials and the wavelength.

FIG. 2 shows an absorptivity spectrum of a vinyl chloride resin with a thickness of 100 μm in the ultraviolet-visible range. Light absorption is large at wavelengths shorter than 0.38 μm.

FIG. 2 shows an absorptivity spectrum of a vinylidene chloride resin with a thickness of 100 μm in the ultraviolet-visible range. A slight increase can be observed in the absorptivity spectrum at wavelengths shorter than 0.4 μm.

FIG. 2 also shows an absorptivity spectrum of an ethylene terephthalate resin with a thickness of 40 μm in the ultraviolet-visible range and an absorptivity spectrum of an ethylene resin in the ultraviolet-visible range.

Figure 3:
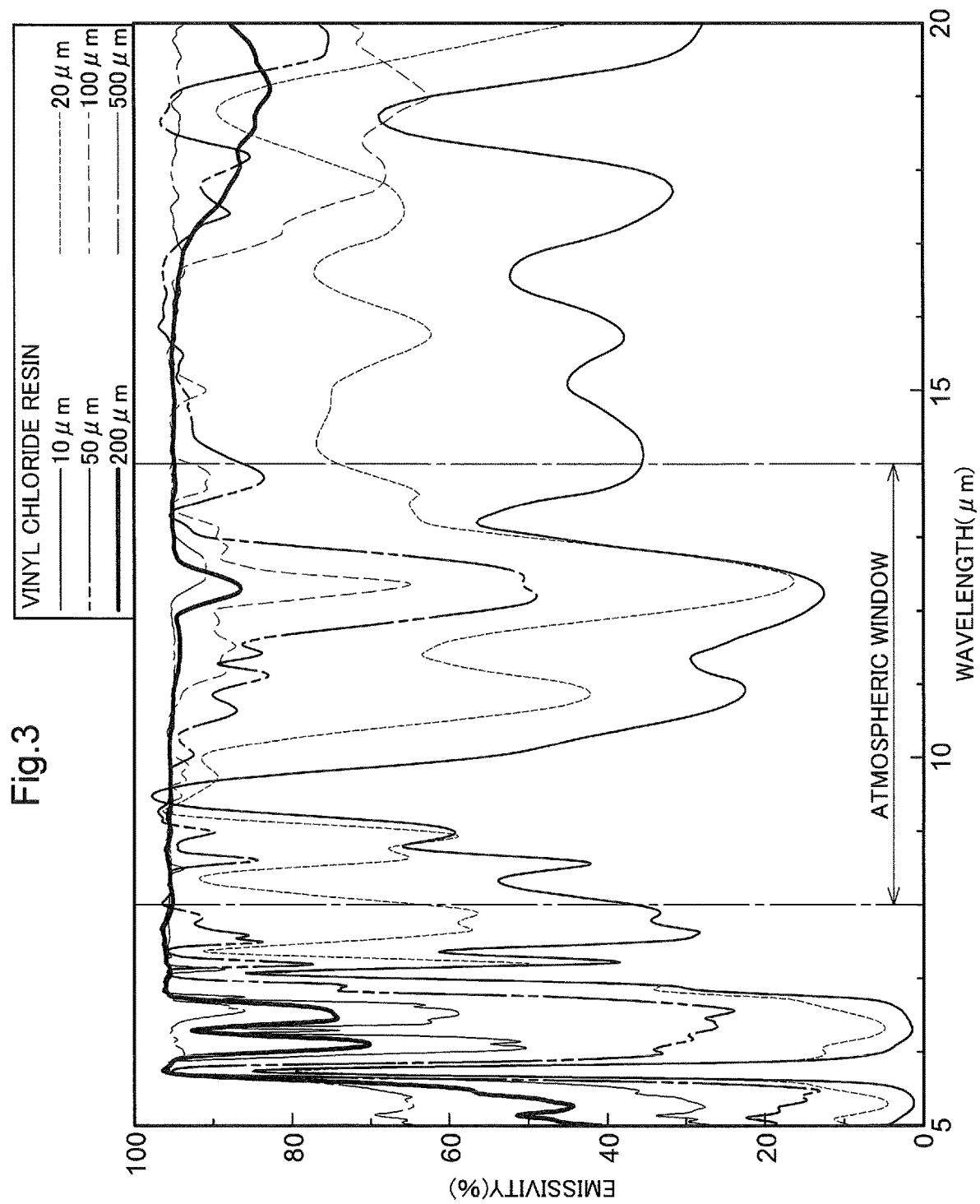
FIG. 3 is a diagram showing an emissivity spectrum of a vinyl chloride resin.
Figure 4:
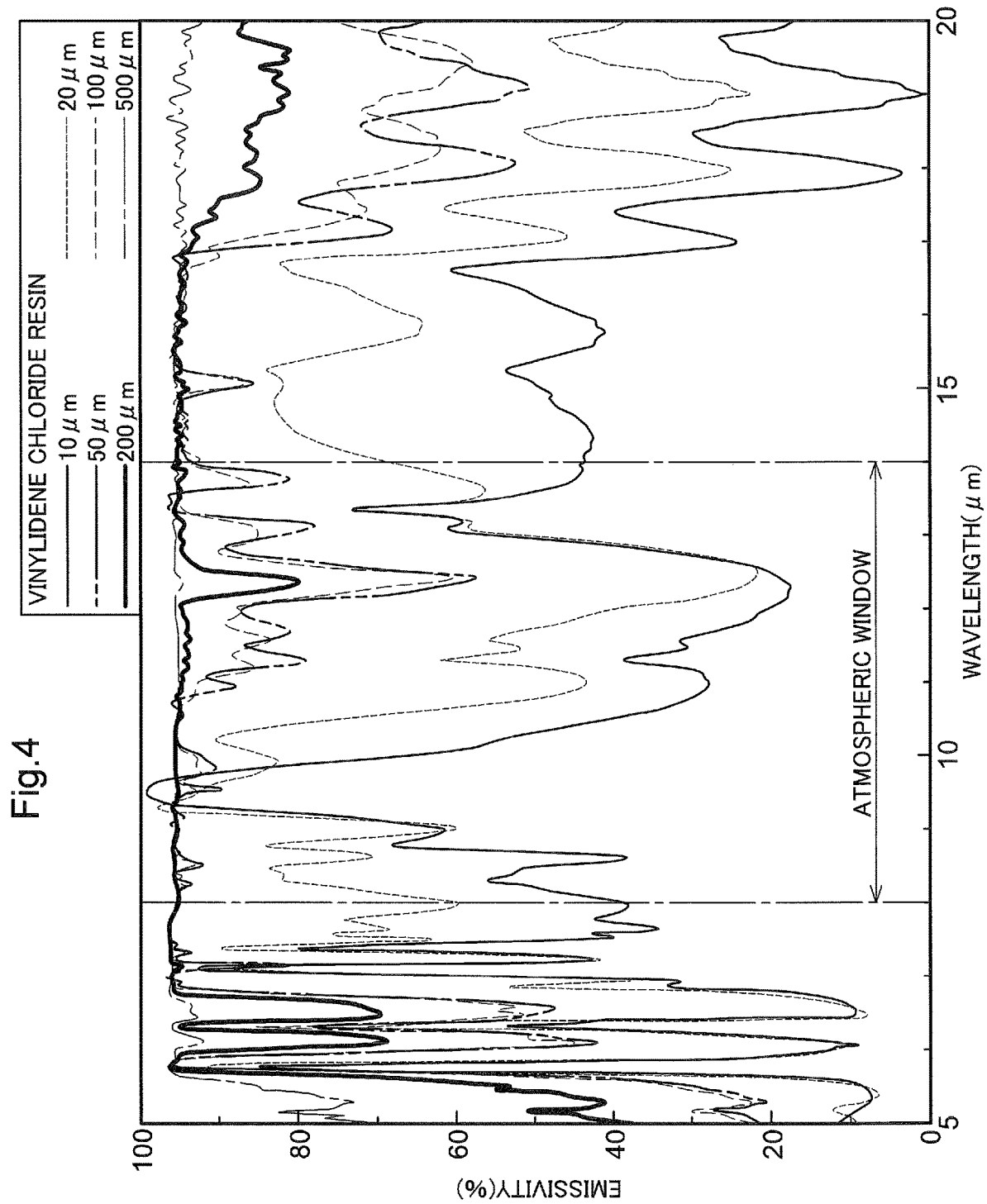
FIG. 4 is a diagram showing an emissivity spectrum of a vinylidene chloride resin.

FIG. 3 shows the emissivity of a vinyl chloride resin (PVC), which has a carbon-chlorine bond, in the atmospheric window. Also, FIG. 4 shows the emissivity of a vinylidene chloride resin (PVDC), which has a carbon-chlorine bond, in the atmospheric window.

As for the carbon-chlorine bond, an absorption coefficient for stretching vibration of C—Cl appears around a wavelength of 12 μm over a wide range with a half width of 1 μm or more.

Also, in the case of the vinyl chloride resin, an absorption coefficient for bending vibration of C—H in an alkene contained in the main chain appears at a wavelength of about 10 μm under the influence of electron-withdrawing of chlorine. The same also applies to the vinylidene chloride resin.

Under the influence of these, a wavelength average emissivity when the thickness is 10 μm is 43% in the wavelength range from 8 μm to 14 μm and falls within the prescribed range of the wavelength average emissivity of 40% or more. As shown in FIGS. 3 and 4, the emissivity in the atmospheric window range increases as the film thickness is increased.

As shown in FIG. 3, in the case of the vinyl chloride resin, the amount of heat radiation in the atmospheric window range hardly increases even when the film thickness is increased to more than 100 μm. That is, in the case of the vinyl chloride resin, heat radiation in the atmospheric window occurs in a portion of the resin material that is within a depth of about 100 μm from the surface, and radiation from a deeper portion does not go to the outside.

FIG. 4 shows that the matter described for the vinyl chloride resin also applies to the vinylidene chloride resin.

As described above, heat radiation from a surface of a resin material in the atmospheric window range occurs in a portion of the resin material that is within a depth of about 100 μm from the surface, and when the thickness of the resin material is increased to more than 100 μm, cold heat obtained through radiative cooling performed by the radiative cooling layer CP is insulated by a portion of the resin material that does not contribute to heat radiation.

Assume a case where an ideal resin material layer J that does not absorb sunlight at all is formed on the light reflective layer B. In this case, sunlight is only absorbed by the light reflective layer B of the radiative cooling layer CP.

Resin materials generally have a thermal conductivity of about 0.2 W/m/K, and when a calculation is performed taking the thermal conductivity into account, the temperature of a cooling surface (a surface of the light reflective layer B, which is opposite to the resin material layer J) increases when the thickness of the resin material layer J is larger than 20 mm.

Even if there is an ideal resin material that does not absorb sunlight at all, the thermal conductivity of a resin material is generally about 0.2 W/m/K, and accordingly, when the thickness of the resin material layer is larger than 20 mm, the light reflective layer B is heated by solar radiation and the film material E on the light reflective layer side is heated. That is, the thickness of the resin material in the radiative cooling layer CP needs to be 20 mm or less.

[Thickness of Resin Material Layer]

From the viewpoint of practical use of the radiative cooling layer CP, the thinner the resin material layer J, the better. The thermal conductivity of a resin material is generally lower than those of metal, glass, and the like. In order to effectively cool the film material E, it is preferable that the resin material layer J has the minimum required thickness. Heat radiation in the atmospheric window increases as the film thickness of the resin material layer J is increased, and heat radiation energy in the atmospheric window is saturated when the film thickness exceeds a certain thickness.

Although the film thickness of the resin material layer at which heat radiation energy is saturated varies according to the resin material, in the case of a resin having a carbon-chlorine bond, heat radiation energy is saturated even when the thickness is 100 µm, and sufficient heat radiation can be obtained in the atmospheric window range even when the thickness is 50 µm. The smaller the thickness of the resin material is, the higher the thermal transmittance becomes and the more effectively the temperature of the film material E can be reduced. In the case of a resin having a carbon-chlorine bond, when the thickness is 50 µm or less, thermal insulation properties are suppressed and the film material E can be effectively cooled. In the case of a resin having a carbon-chlorine bond, the film material E can be effectively cooled when the thickness is 100 µm or less.

When the thickness is reduced, it is possible to obtain an effect other than the effect of suppressing thermal insulation properties and facilitating conduction of cold heat. That is, it is possible to suppress light absorption by $CH$, $CH_2$, and $CH_3$ in the near-infrared range, which occurs in the case of a resin having a carbon-chlorine bond. When the thickness is reduced, absorption of sunlight by these can be suppressed and consequently, cooling capability of the radiative cooling layer CP is increased.

From the viewpoint described above, in the case of a vinyl chloride resin and a vinylidene chloride resin, which are resins having a carbon-chlorine bond, the radiative cooling effect can be more effectively exhibited under solar radiation when the thickness is 50 µm or less.

[Details of Light Reflective Layer]

In order to make the light reflective layer B have the reflectance characteristics described above, silver or a silver alloy needs to be used as a reflective material on the radiative surface H side (the resin material layer J side).

Figure 5:
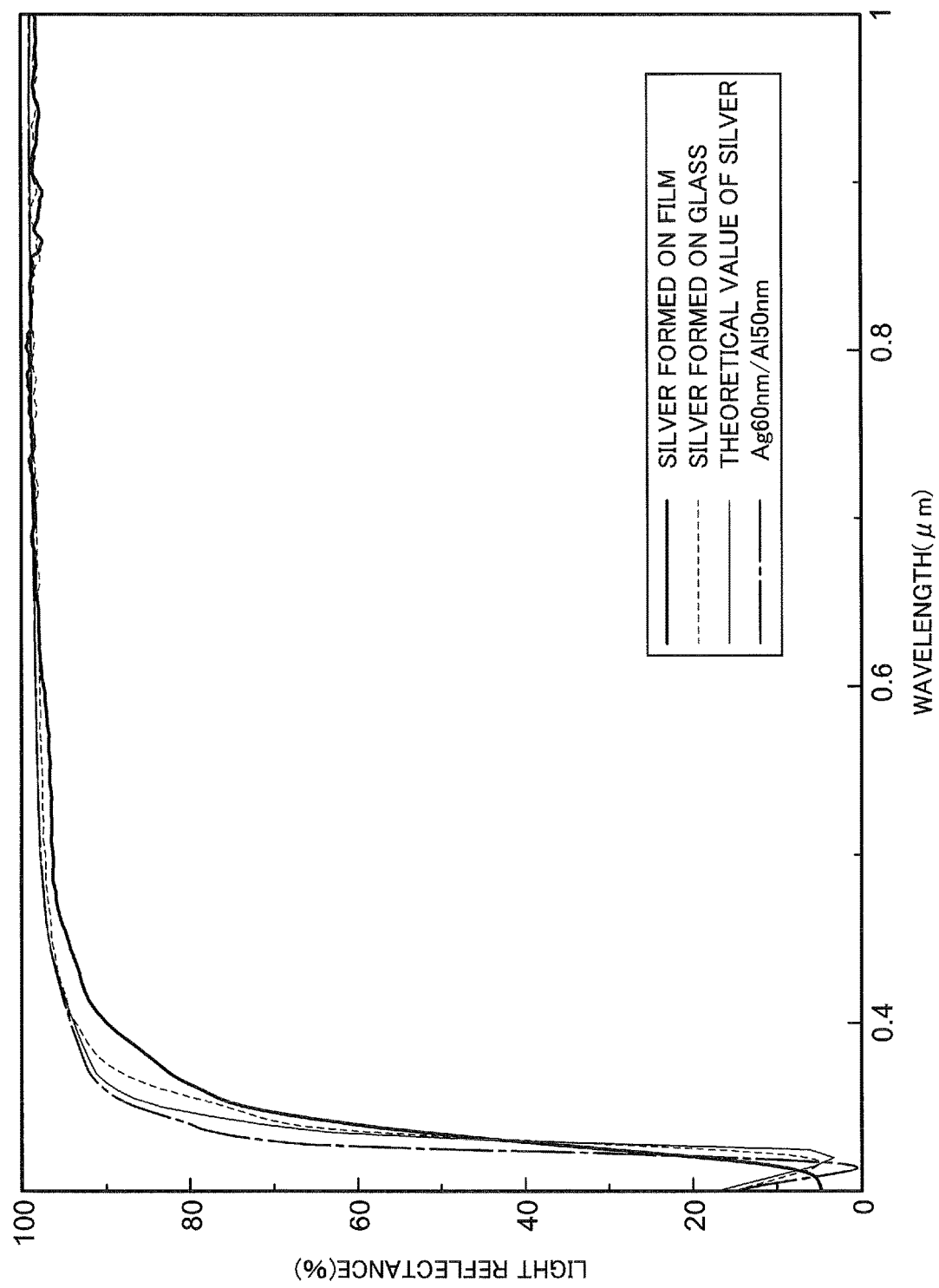
FIG. 5 is a diagram showing a reflectance spectrum of a light reflective layer that contains silver as a base material.

As shown in FIG. 5, when silver is used as a base material of the light reflective layer B, the light reflective layer B can have the required reflectance.

In a case where sunlight is to be reflected only by silver or a silver alloy in such a manner as to satisfy the reflectance characteristics described above, a thickness of 50 nm or more is required.

However, in order to make the light reflective layer B flexible, the thickness needs to be 100 µm or less. If the thickness is larger than 100 µm, the light reflective layer becomes difficult to bend.

It is possible to use, as a silver alloy, an alloy obtained by adding copper, palladium, gold, zinc, tin, magnesium, nickel, or titanium in an amount of about 0.4 mass % to 4.5 mass % to silver, for example. As a specific example, it is possible to use "APC-TR (manufactured by Furuya Metal Co., Ltd.)", which is a silver alloy manufactured by adding copper and palladium to silver.

In order to make the light reflective layer B have the reflectance characteristics described above, it is also possible to adopt a layered structure including (i) silver or a silver alloy adjacent to the protective layer D and (ii) aluminum or an aluminum alloy apart from the protective layer D. In this case as well, it is necessary to use silver or a silver alloy as the reflective material on the radiative surface H side (the resin material layer J side).

In the case where the light reflective layer is constituted by two layers made of silver (silver alloy) and aluminum (aluminum alloy), the thickness of the silver layer needs to be 10 nm or more and the thickness of the aluminum layer needs to be 30 nm or more.

However, in order to make the light reflective layer B flexible, the sum of the thickness of the silver layer and the thickness of the aluminum layer needs to be 100 µm or less. If the sum is larger than 100 µm, the light reflective layer becomes difficult to bend.

It is possible to use, as an aluminum alloy, an alloy obtained by adding copper, manganese, silicon, magnesium, zinc, carbon steel for mechanical structures, yttrium, lanthanum, gadolinium, or terbium to aluminum.

Silver and a silver alloy are weak to rain and moisture and need to be protected from them. Also, discoloration of silver and a silver alloy needs to be suppressed. Therefore, the protective layer D that protects silver needs to be adjacent to silver or a silver alloy as shown in FIGS. 6 to 9.

Details of the protective layer D will be described later.

[Specific Configuration of Radiative Cooling Film Material]

Resin materials forming the resin material layer J and the protective layer D are flexible, and accordingly, when the light reflective layer B is formed as a thin film, the light reflective layer B can be made flexible as well, and consequently the radiative cooling layer CP can be made as a flexible film (radiative cooling film).

By attaching the radiative cooling layer CP (radiative cooling film) to the outer surface of the film material E with use of the joining layer S formed from an adhesive agent or a pressure-sensitive adhesive agent as shown in FIGS. 6 to 9, it is possible to cool the film material E.

Examples of adhesive agents and pressure-sensitive adhesive agents that can be used for the joining layer S include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent).

FIGS. 6 to 9 show a film material E including a film material main body Eh that has been soaked in a solution of a vinyl chloride resin or a vinylidene chloride resin to impregnate the film material main body Eh with the vinyl chloride resin or the vinylidene chloride resin.

Accordingly, the film material E includes a front surface-side resin layer Ek formed from the vinyl chloride resin or the vinylidene chloride resin and serving as a front surface portion close to the radiative cooling layer CP, in addition to the film material-side resin layer Ej formed from a vinyl chloride resin or a vinylidene chloride resin and serving as the rear surface portion apart from the radiative cooling layer CP.

That is, the film material E is constituted by the front surface-side resin layer Ek, the film material main body Eh, and the film material-side resin layer Ej stacked on each other.

Of course, a configuration is also possible in which the front surface-side resin layer Ek is omitted from the film material E shown in FIGS. 6 to 9, and the film material E is constituted by the film material main body Eh and the film material-side resin layer Ej stacked on each other as shown in FIG. 1.

The film material E constituted by the film material main body Eh and the film material-side resin layer Ej stacked on each other can be produced by applying vinyl chloride resin or vinylidene chloride resin to the film material main body Eh to form the film material-side resin layer Ej or attaching a film of vinyl chloride resin or vinylidene chloride resin, which has been separately produced, to the film material main body Eh to form the film material-side resin layer Ej, for example.

Various forms are conceivable to make the radiative cooling layer CP in the form of a film. For example, it is conceivable to apply the protective layer D and the resin material layer J to the light reflective layer B formed in a film shape. Alternatively, it is conceivable to attach the protective layer D and the resin material layer J to the light reflective layer B formed in a film shape. Alternatively, it is conceivable to apply or attach the protective layer D to the resin material layer J formed in a film shape, and form the light reflective layer B on the protective layer D through vapor deposition, sputtering, ion plating, a silver mirror reaction, or the like.

Figure 6:
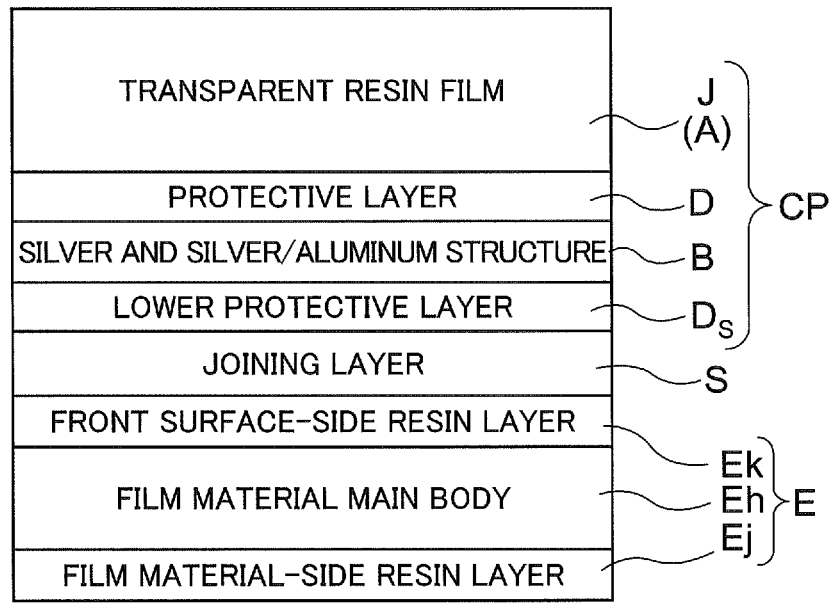
FIG. 6 is a diagram showing a specific configuration of the radiative cooling film material.

More specifically, a radiative cooling layer CP (radiative cooling film) shown in FIG. 6 is obtained by forming the protective layer D on the upper side of the light reflective layer B, forming the resin material layer J on the protective layer D, and further forming a lower protective layer Ds on the lower side of the light reflective layer B in a case where the light reflective layer B is constituted by a single layer of silver or a silver alloy or two layers respectively made of silver (silver alloy) and aluminum (aluminum alloy). Note that the lower protective layer Ds is formed from an acrylic resin, for example.

As a method for producing the radiative cooling layer CP (radiative cooling film) shown in FIG. 6, it is possible to use a method of applying the protective layer D, the light reflective layer B, and the lower protective layer Ds in this order on the resin material layer J to form these layers into a single piece.

Figure 7:
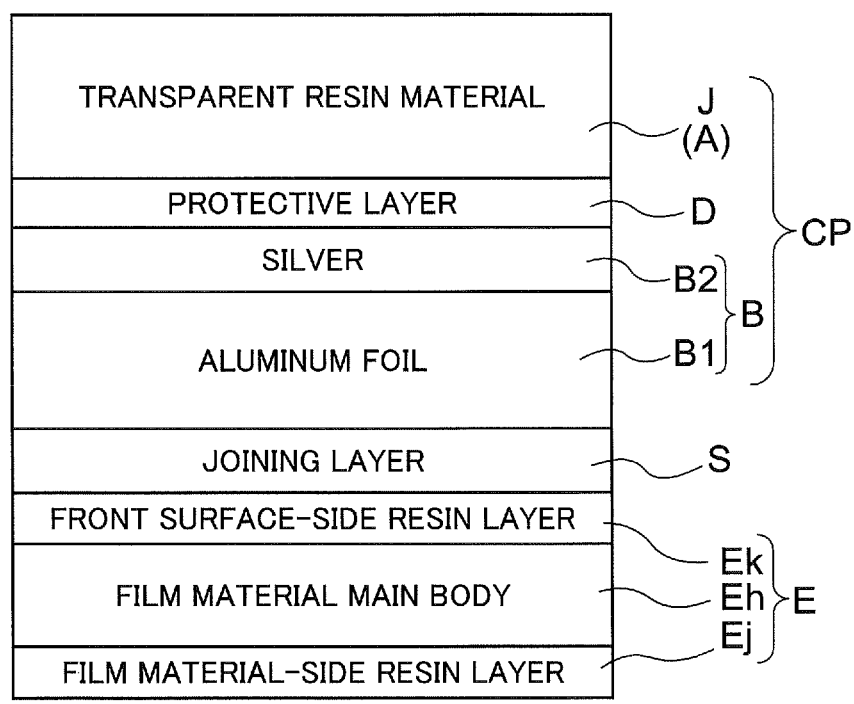
FIG. 7 is a diagram showing a specific configuration of the radiative cooling film material.

A radiative cooling layer CP (radiative cooling film) shown in FIG. 7 is obtained by forming the protective layer D on the upper side of the light reflective layer B, and forming the resin material layer J on the protective layer D in a case where the light reflective layer B is constituted by (i) an aluminum layer B1 formed from an aluminum foil that functions as aluminum (an aluminum alloy) and (ii) a silver layer B2 made of silver or a silver alloy.

As a method for producing the radiative cooling layer CP (radiative cooling film) shown in FIG. 7, it is possible to use a method of applying the silver layer B2, the protective layer D, and the resin material layer J in this order onto the aluminum layer B1 formed from an aluminum foil to form these layers into a single piece.

It is also possible to use another method of forming the resin material layer J in a film shape, applying the protective layer D and the silver layer B2 in this order on the film-shaped resin material layer J, and attaching the aluminum layer B1 to the silver layer B2.

Figure 8:
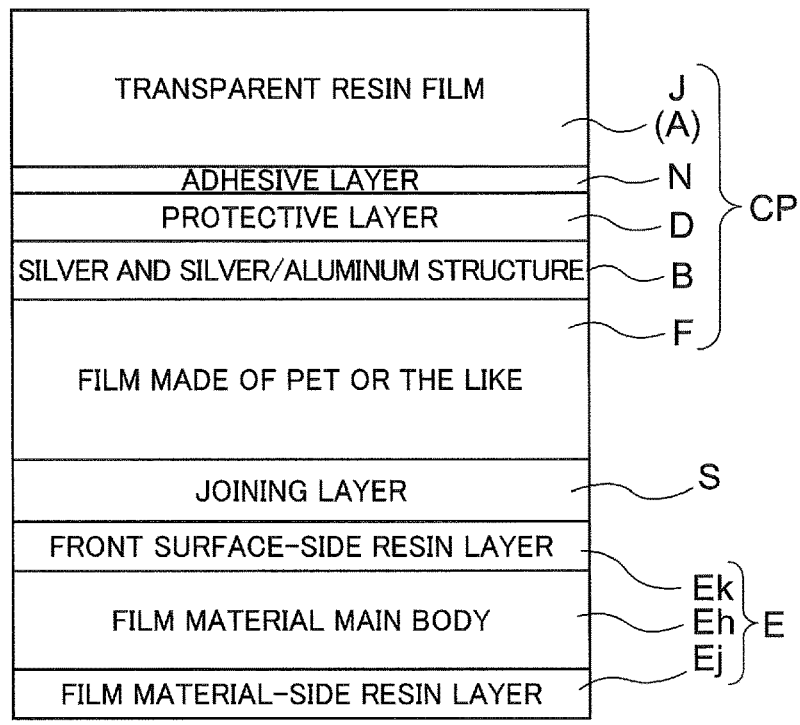
FIG. 8 is a diagram showing a specific configuration of the radiative cooling film material.

A radiative cooling layer CP (radiative cooling film) shown in FIG. 8 is obtained by forming the protective layer D on the upper side of the light reflective layer B, forming the resin material layer J on the protective layer D, and forming a film layer F made of PET or the like on the lower side of the light reflective layer B in a case where the light reflective layer B is constituted by a single layer made of silver or a silver alloy or two layers respectively made of silver (silver alloy) and aluminum (aluminum alloy).

As a method for producing the radiative cooling layer CP (radiative cooling film) shown in FIG. 8, it is possible to use a method of applying the light reflective layer B and the protective layer D in this order on the film layer F (corresponding to a substrate) formed in a film shape from PET (ethylene terephthalate resin) or the like to form these layers into a single piece, and joining the resin material layer J, which has been separately formed, to the protective layer D with use of an adhesive layer N.

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent to sunlight.

Figure 9:
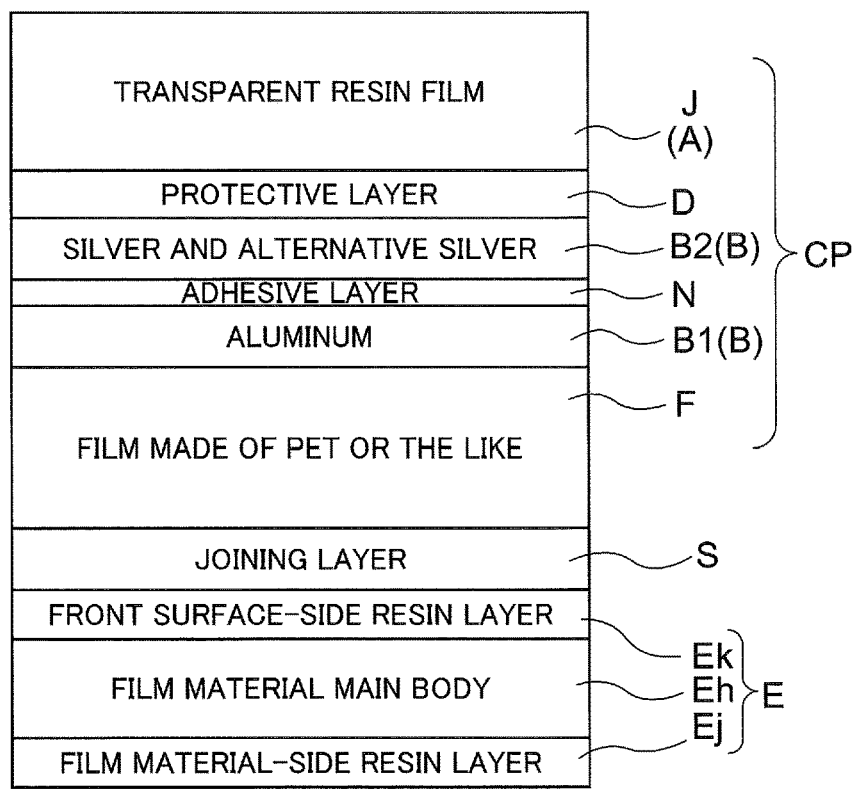
FIG. 9 is a diagram showing a specific configuration of the radiative cooling film material.

A radiative cooling layer CP (radiative cooling film) shown in FIG. 9 is obtained by forming the light reflective layer B that is constituted by (i) an aluminum layer B1 that functions as aluminum (an aluminum alloy) and (ii) a silver layer B2 made of silver or a silver alloy (alternative silver) on a film layer F (corresponding to a substrate) formed in a film shape from PET (ethylene terephthalate resin) or the like in such a manner that the aluminum layer B1 is on the film layer F, and forming the protective layer D on the upper side of the silver layer B2, and forming the resin material layer J on the protective layer D.

As a method for producing the radiative cooling layer CP (radiative cooling film) shown in FIG. 9, it is possible to use a method of applying the aluminum layer B1 to the film layer F to form the film layer F and the aluminum layer B1 as a single piece, applying the protective layer D and the silver layer B2 to the resin material layer J formed in a film shape to form the resin material layer J, the protective layer D, and the silver layer B2 as a single piece, and joining the aluminum layer B1 to the silver layer B2 with use of an adhesive layer N.

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent to sunlight.

[Details of Protective Layer]

The protective layer D is formed from a polyolefin resin with a thickness of 300 nm or more and 40 µm or less or polyethylene terephthalate with a thickness of 17 µm or more and 40 µm or less.

Examples of the polyolefin resin include polyethylene and polypropylene.

As described above, FIG. 2 shows the absorptivity of polyethylene for ultraviolet rays.

Figure 10:
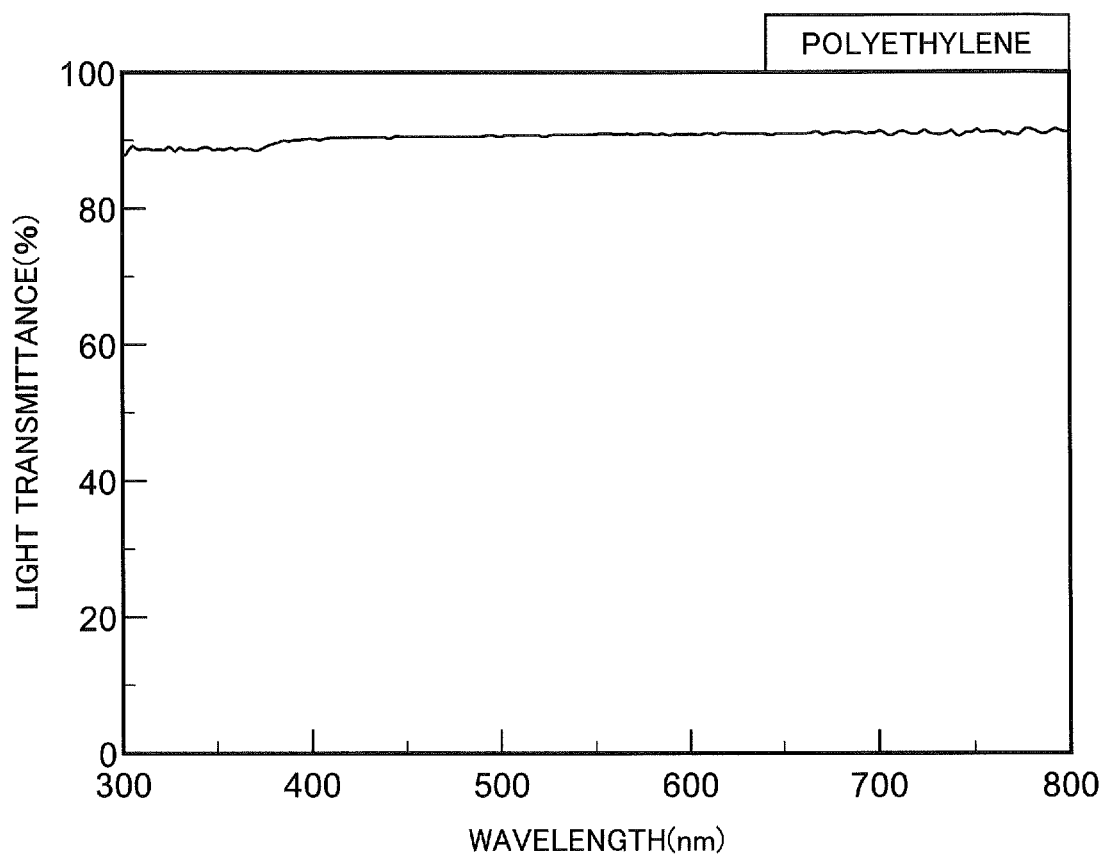
FIG. 10 is a diagram showing a relationship between the light transmittance of polyethylene and the wavelength.

Also, FIG. 10 shows a light transmittance of polyethylene, which is preferably used as a synthetic resin to form the protective layer D.

The radiative cooling layer CP (radiative cooling film) exhibits the radiative cooling effect not only at night but also under solar radiation. Accordingly, in order to maintain the state where the light reflective layer B exhibits its light reflecting function, it is necessary to prevent discoloration of silver constituting the light reflective layer B under solar radiation by protecting the light reflective layer B with the protective layer D.

In the case where the protective layer D is formed from a polyolefin resin with a thickness of 300 nm or more and 40 µm or less, the protective layer D is unlikely to deteriorate by absorbing ultraviolet rays because the polyolefin resin is a synthetic resin that has an absorptivity of 10% or less for ultraviolet rays over the entire wavelength range of ultraviolet rays from 0.295 µm to 0.4 µm.

Moreover, since the thickness of the polyolefin resin forming the protective layer D is 300 nm or more, the protective layer D favorably exhibits a blocking function of blocking radicals generated in the resin material layer J to keep the radicals from reaching silver or a silver alloy included in the light reflective layer B and blocking moisture that has permeated through the resin material layer J to keep the moisture from reaching silver or a silver alloy included in the light reflective layer B, and thus discoloration of silver or a silver alloy included in the light reflective layer B can be suppressed.

When ultraviolet rays are absorbed by the protective layer D formed from the polyolefin resin, the protective layer D deteriorates while forming radicals on the side of its surface apart from the light reflective layer B, the generated radicals do not reach the light reflective layer B because the protective layer D has a thickness of 300 nm or more. Also, although the protective layer D deteriorates while forming radicals, the progress of deterioration is slow because absorption of ultraviolet rays is low, and therefore, the protective layer D exhibits the above-described blocking function for a long period of time.

In the case where the protective layer D is formed from an ethylene terephthalate resin with a thickness of 17 µm or more and 40 µm or less, the ethylene terephthalate resin is a resin material that has a higher absorptivity for ultraviolet rays than the polyolefin resin in the wavelength range of ultraviolet rays from 0.295 µm to 0.4 µm. However, the protective layer has a thickness of 17 µm or more, and therefore, the protective layer D favorably exhibits the blocking function of blocking radicals generated in the resin material layer J to keep the radicals from reaching silver or a silver alloy included in the light reflective layer B and blocking moisture that has permeated through the resin material layer J to keep the moisture from reaching silver or a silver alloy included in the light reflective layer B for a long period of time, and thus discoloration of silver or a silver alloy included in the light reflective layer B can be suppressed.

That is, the protective layer D formed from the ethylene terephthalate resin deteriorates by absorbing ultraviolet rays while forming radicals on the side of its surface apart from the light reflective layer B, but the generated radicals do not reach the light reflective layer B because the protective layer D has a thickness of 17 µm or more. Also, although the protective layer D deteriorates while forming radicals, the protective layer D has a thickness of 17 µm or more, and accordingly, exhibits the above-described blocking function for a long period of time.

When described in more detail, the ethylene terephthalate resin (PET) deteriorates as a result of ester bonds of ethylene glycol and terephthalic acid being cleaved by ultraviolet rays and radicals being formed. This deterioration progresses sequentially from the surface of the ethylene terephthalate resin (PET) irradiated with ultraviolet rays.

For example, when the ethylene terephthalate resin (PET) is irradiated with ultraviolet rays with an intensity equivalent to that in Osaka, ester bonds of the ethylene terephthalate resin (PET) are cleaved sequentially from the irradiated surface by a depth of about 9 nm per day. The ethylene terephthalate resin (PET) has been sufficiently polymerized, and therefore, a surface portion of the ethylene terephthalate resin (PET) where the cleavage has occurred does not damage silver (silver alloy) included in the light reflective layer B, but when a cleaved end of the ethylene terephthalate resin (PET) reaches the silver (silver alloy) included in the light reflective layer B, the silver (silver alloy) is discolored.

Therefore, in order to make the protective layer D durable for a year or longer when used outdoors, the protective layer needs to have a thickness of about 3 µm, which is calculated by adding up 9 nm/day for 365 days. In order to make the protective layer D formed from the ethylene terephthalate resin (PET) durable for three years or longer, the protective layer needs to have a thickness of 10 µm or more. In order to make the protective layer D durable for five years or longer, the protective layer needs to have a thickness of 17 µm or more.

Note that the upper limit value of the thickness of the protective layer D is set for the cases where the protective layer D is formed from the polyolefin resin or the ethylene terephthalate resin in order to avoid a situation in which the protective layer D exhibits thermal insulation properties, which do not contribute to radiative cooling. That is, as the thickness of the protective layer D is increased, the protective layer D exhibits thermal insulation properties, which do not contribute to radiative cooling, and therefore, the upper limit value of the thickness is set to prevent the protective layer D from exhibiting thermal insulation properties, which do not contribute to radiative cooling, while allowing the protective layer D to exhibit the function of protecting the light reflective layer B.

When the thickness of the protective layer D is increased, there is no demerit in preventing coloration of silver (silver alloy) included in the light reflective layer B, but there arises a problem in radiative cooling as described above. That is, thermal insulation properties of a radiative cooling material are enhanced when the thickness is increased.

Figure 14:
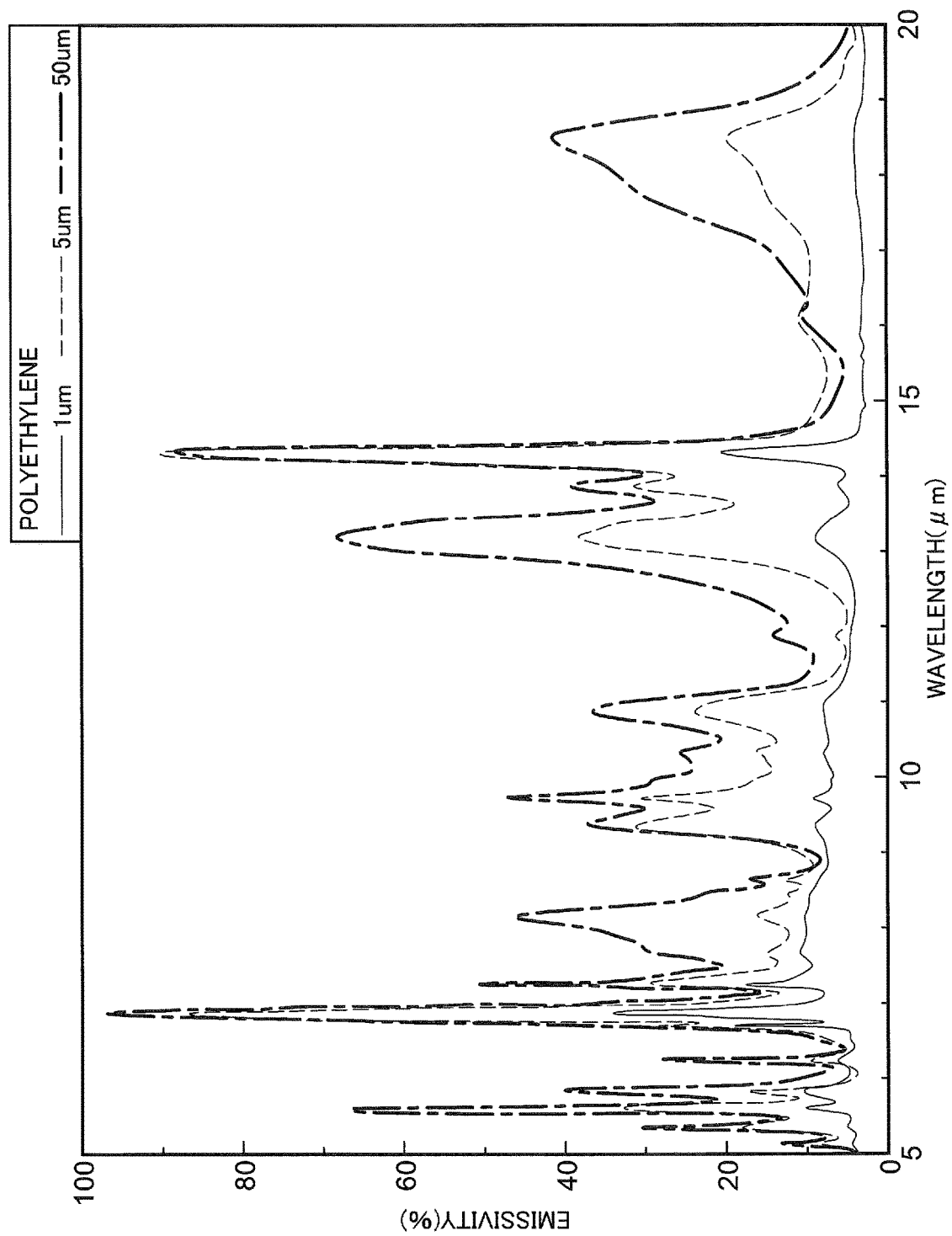
FIG. 14 is a diagram showing an emissivity spectrum of polyethylene.

For example, in the case of a resin that contains polyethylene as a main component, which is an excellent synthetic resin for forming the protective layer D, the emissivity in the atmospheric window is small as shown in FIG. 14, and therefore, even if the thickness is increased, the increase does not contribute to radiative cooling. Conversely, thermal insulation properties of the radiative cooling material are enhanced when the thickness is increased. Next, when the thickness is increased, absorption through vibration of the main chain increases in the near-infrared range, and an effect of increasing absorption of sunlight increases.

For these reasons, a protective layer D having a large thickness is disadvantageous in radiative cooling. From the viewpoints described above, the thickness of the protective layer D formed from the polyolefin resin is preferably 5 µm or less, and more preferably 1 µm.

In the case where the radiative cooling film material includes the adhesive layer N between the resin material layer J and the protective layer D as shown in FIG. 8, radicals are generated from the adhesive layer N as well, but it is possible to keep the radicals generated in the adhesive layer N from reaching the light reflective layer B for a long period of time when the thickness of the polyolefin resin forming the protective layer D is 300 nm or more or the thickness of the ethylene terephthalate resin forming the protective layer D is 17 µm or more.

[Consideration on Protective Layer]

Figure 11:
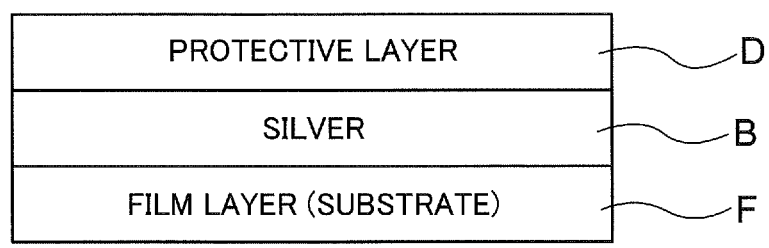
FIG. 11 is a diagram showing a configuration for a test.

In order to examine a difference in coloration of silver according to the protective layer D, samples that did not include the resin material layer J as the infrared radiative layer A and in which the protective layer D was exposed were produced as shown in FIG. 11 and coloration of silver after the samples were irradiated with simulated sunlight was examined.

That is, two types of resins, one of which being a common acrylic resin that absorbs ultraviolet rays (e.g., a methyl methacrylate resin in which a benzotriazole ultraviolet absorbing agent is mixed) and the other being polyethylene, were each applied as the protective layer D to a film layer F (corresponding to a substrate) provided with silver that served as the light reflective layer B, with use of a bar coater to form the samples, and functions of the resins as the protective layer D were examined. Thicknesses of the applied protective layers D were 10 µm and 1 µm, respectively.

Note that the film layer F (corresponding to a substrate) was formed in a film shape from PET (ethylene terephthalate resin) or the like.

Figure 13:
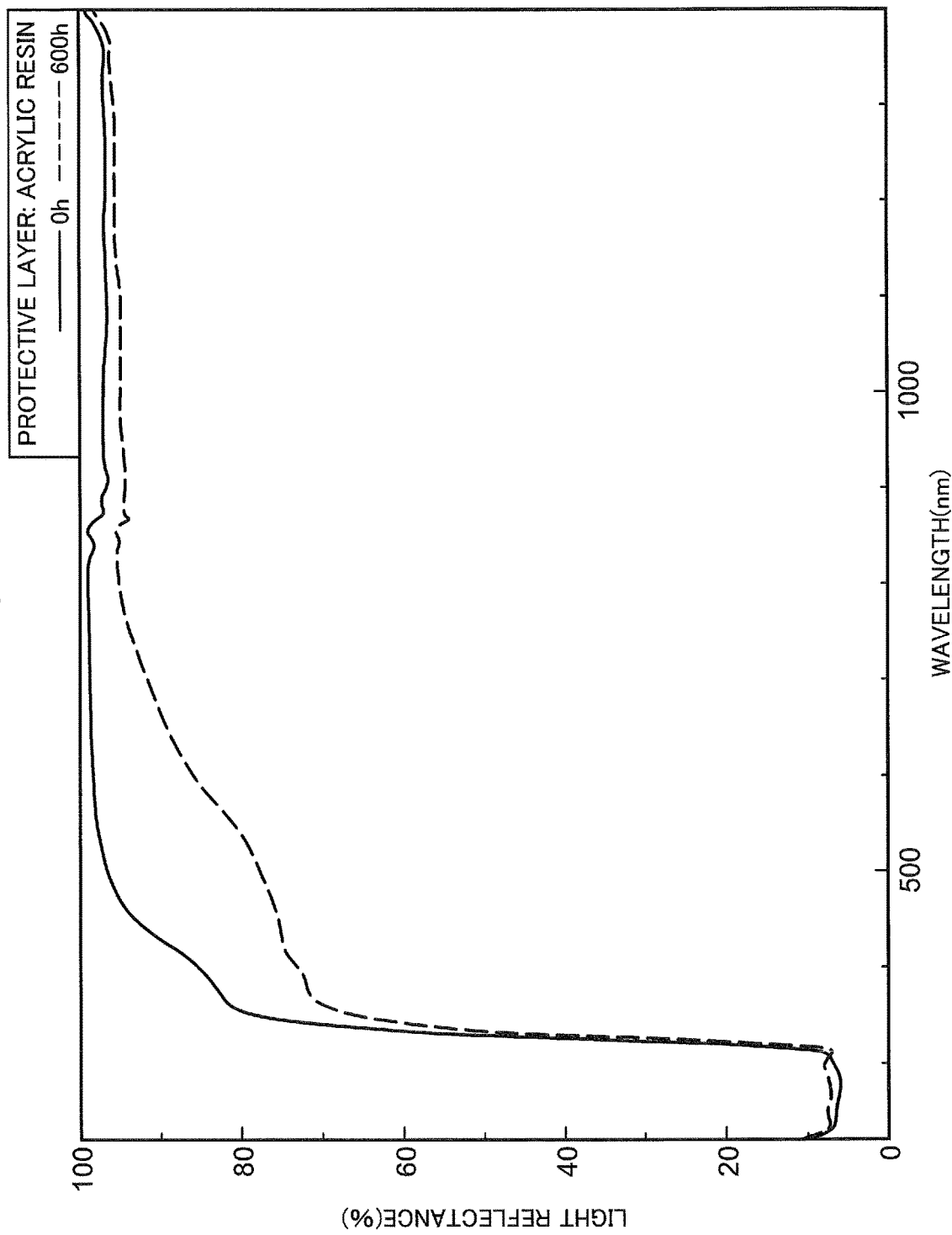
FIG. 13 is a diagram showing a test result of a case where the protective layer was made of an ultraviolet absorbing acrylic resin.

As shown in FIG. 13, in the case where the protective layer D was formed from the acrylic resin that absorbs ultraviolet rays well, the protective layer D was decomposed by ultraviolet rays and formed radicals, and silver was immediately discolored to yellow, which makes the radiative cooling layer CP unable to function no longer (i.e., the radiative cooling layer absorbs sunlight and the temperature increases under solar radiation, as is the case with common materials).

Note that the line denoted by 600h in FIG. 13 shows a reflectance spectrum after a xenon weather test (ultraviolet light energy: 60 W/m$^2$) was performed for 600 h (hours) under the conditions specified in JIS 5600-7-7. Also, the line denoted by 0 h shows a reflectance spectrum before the xenon weather test was performed.

Figure 12:
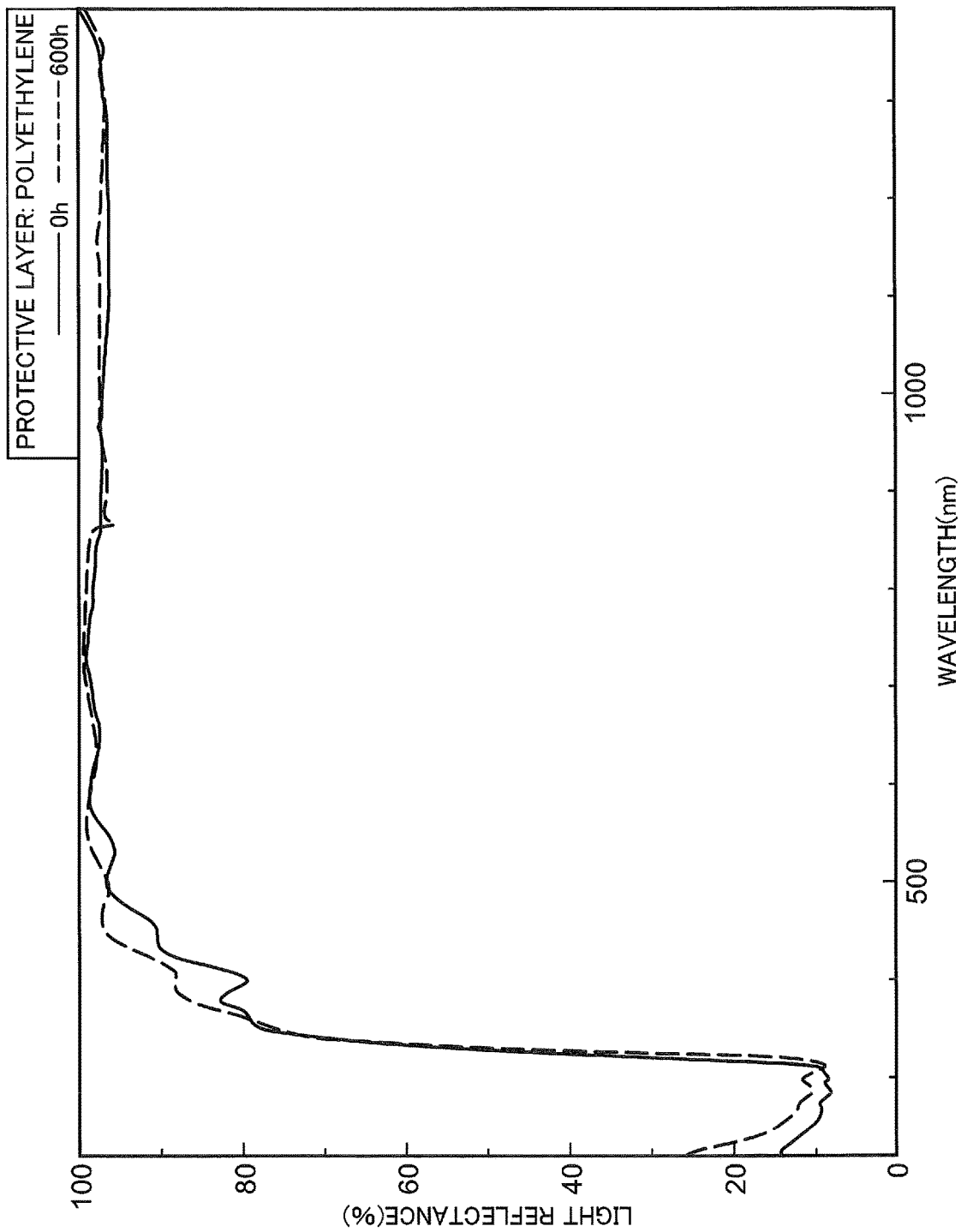
FIG. 12 is a diagram showing a test result of a case where a protective layer was made of polyethylene.

As shown in FIG. 12, in the case where the protective layer D was formed from polyethylene that has a low absorptivity for ultraviolet rays, it can be found that the reflectance did not decrease in the near-infrared range and the visible range. That is, a resin (polyolefin resin) that contains polyethylene as a main component absorbs almost no ultraviolet rays included in the sunlight reaching the ground, and accordingly, is unlikely to form radicals even when irradiated with sunlight. Therefore, silver included in the light reflective layer B is not colored even under solar radiation.

Note that the line denoted by 600h in FIG. 12 shows a reflectance spectrum after a xenon weather test (ultraviolet light energy: 60 W/m$^2$) was performed for 600 h (hours) under the conditions specified in JIS 5600-7-7. Also, the line denoted by 0 h shows a reflectance spectrum before the xenon weather test was performed.

Note that the reflectance spectrums in this wavelength range wave because of Fabry-Pérot resonance of the polyethylene layer. It can be found that positions of the resonance slightly differ between the line denoted by 0 h and the line denoted by 600h due to the thickness of the polyethylene layer being changed by heat applied during the xenon weather test, for example, but no significant decrease in the reflectance due to discoloration of silver to yellow is observed in the ultraviolet-visible range.

Note that a fluorocarbon resin can also be used as a material of the protective layer D from the viewpoint of ultraviolet absorption, but when the protective layer D is actually formed from a fluorocarbon resin, the fluorocarbon resin is colored and deteriorates while the protective layer D is formed. Therefore, the fluorocarbon resin cannot be used as a material of the protective layer D.

Also, silicone can be used as a material of the protective layer D from the viewpoint of ultraviolet absorption, but adhesion between silicone and silver (silver alloy) is very bad, and therefore, silicone cannot be used as a material of the protective layer D

[Mixing of Plasticizer]

In the case where a vinyl chloride-based resin is used to form the resin material layer J, it is preferable to increase flexibility by mixing a plasticizer in the vinyl chloride-based resin.

The plasticizer mixed in the vinyl chloride-based resin is any one of phthalic acid esters, aliphatic dibasic acid esters, and phosphoric acid esters.

The plasticizer is mixed in an amount of 1 part by weight or more and 200 parts by weight or less relative to 100 parts by weight of the vinyl chloride-based resin. From the viewpoint of processing, the plasticizer is preferably mixed in an amount of 100 parts by weight or less.

Any one of or a combination of two or more of the following aliphatic dibasic acid esters may be used as the plasticizer: adipic acid esters, adipic acid ester copolymers, azelaic acid esters, azelaic acid ester copolymers, sebacic acid esters, sebacic acid ester copolymers, succinic acid esters, and succinic acid ester copolymers.

An aliphatic dibasic acid ester used as the plasticizer is preferably formed through ester bonding between an aliphatic dibasic acid and two molecules of a saturated aliphatic alcohol.

A phthalic acid ester used as the plasticizer is preferably formed through ester bonding between phthalic acid and two molecules of a saturated aliphatic alcohol.

A phosphoric acid ester used as the plasticizer is preferably a phosphoric acid triester or an aromatic phosphoric acid ester.

<Details of Phthalic Acid Esters>

Examples of phthalic acid esters include:
dimethyl phthalate (DMP), diethyl phthalate (DEP), dibutyl phthalate (DPP), di-2-ethylhexyl phthalate (DOP), diisononyl phthalate (DINP), diisodecyl phthalate (DIDP), diundecyl phthalate (DUP), ditridecyl phthalate (DTDP), bis(2-ethylhexyl) terephthalate (DOTP), and bis(2-ethylhexyl) isophthalate (DOIP).

<Details of Aliphatic Dibasic Acid Esters>

Examples of aliphatic dibasic acid esters include:
dibutyl adipate (DBA), diisobutyl adipate (DIBA), di-2-ethylhexyl adipate (DOA), diisononyl adipate (DINA), diisodecyl adipate (DIDA), bis-2-ethylhexyl azelate (DOZ), dibutyl sebacate (DBS), di-2-ethylhexyl sebacate (DOS), diisononyl sebacate (DINS), and diethyl succinate (DESU).

Examples of aliphatic dibasic acid esters also include an aliphatic polyester having a molecular weight of 400 to 4000 and synthesized through copolymerization (polyesterification) between a dibasic acid such as adipic acid and a diol (difunctional alcohol or glycol).

<Phosphoric Acid Triester>

Examples of phosphoric acid triesters include:
trimethyl phosphate (TMP), triethyl phosphate (TEP), tributyl phosphate (TBP), and tris(2-ethylhexyl) phosphate (TOP).

<Aromatic Phosphoric Acid Ester>

Examples of aromatic phosphoric acid esters include:
triphenyl phosphate (TPP), tricresyl phosphate (TCP), trixylenyl phosphate (TXP), cresyl diphenyl phosphate (CDP), and 2-ethylhexyldiphenyl phosphate.

<Evaluation of Suitable Plasticizer>

Plasticizers used for a vinyl chloride resin include phthalic acid esters, aliphatic dibasic acid esters, phosphoric acid triesters, aromatic phosphoric acid esters, trimellitic acid esters, and epoxidized aliphatic acid esters. Compounds listed below were selected from these plasticizers, and 43 parts by weight of each plasticizer was mixed relative to 100 parts by weight of a vinyl chloride resin and evaluated through a xenon weather test.

Note that 0.5 parts by weight of a triazine-based ultraviolet absorbing agent and 0.5 parts by weight of a hindered amine photostabilizer were kneaded with 100 parts by weight of the vinyl chloride resin.

Di-2-ethylhexyl phthalate (DOP) and diisodecyl phthalate (DIDP) were selected as representative examples of phthalic acid esters.

Di-2-ethylhexyl adipate (DOA), a butanediol adipate copolymer (average molecular weight: about 1000), and diisononyl adipate (DINA) were selected as representative examples of aliphatic dibasic acid esters.

Tributyl phosphate (TBP) was selected as a representative example of phosphoric acid triesters.

Tricresyl phosphate (TCP) was selected as a representative example of aromatic phosphoric acid esters.

Tris(2-ethylhexyl) trimellitate (TOTM) was selected as a representative example of trimellitic acid esters.

Epoxidized soybean oil was selected as a representative example of epoxidized aliphatic acid esters.

Durability was evaluated based on results of a durability test in which a xenon weather test was performed for 1920 hours (corresponding to 4 years of outdoor exposure). Note that 487 hours correspond to one year in terms of ultraviolet rays.

The xenon weather test was performed under the following conditions.

UV intensity: 180 W/m$^2$ (wavelength: 295 to 400 nm)
<Conditions without water sprinkling> BPT: 89° C., humidity: 50%, 1 hour and 42 minutes.
<Conditions with water sprinkling> temperature in the chamber: 38° C., humidity: 90%, 18 minutes.

Figure 15:
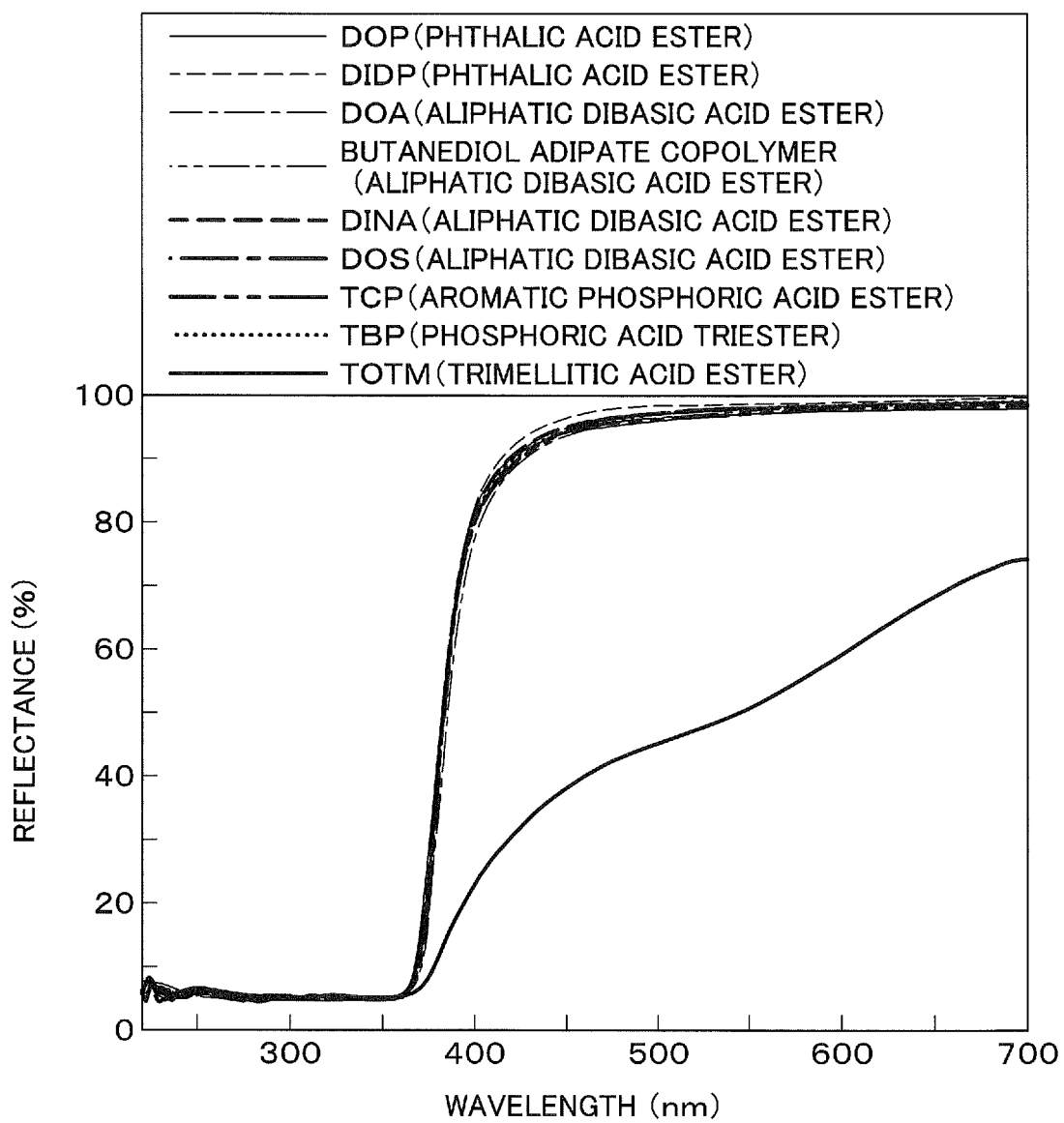
FIG. 15 is a diagram showing experimental results of plasticizers mixed with a vinyl chloride resin.

FIG. 15 shows results of the test carried out for 1920 hours. Note that a vinyl chloride resin was used for the experiment in the present embodiment, but similar results can be obtained for a vinylidene chloride resin as well.

Through the experiment described above, it was found that durability significantly decreased in the cases where a trimellitic acid ester (TOTM) and an epoxidized aliphatic acid ester (epoxidized soybean oil) were used as plasticizers. Note that the result of the epoxidized aliphatic acid ester is not shown in FIG. 15 because discoloration to brown occurred once 1120 hours had elapsed and the test could not be continued.

On the other hand, it was found that when phthalic acid esters, aliphatic dibasic acid esters, phosphoric acid triesters, and aromatic phosphoric acid esters are used, the radiative cooling film material CP can be sufficiently durable to be used for about 4 years. That is, it was found that when phthalic acid esters, aliphatic dibasic acid esters, phosphoric acid triesters, and aromatic phosphoric acid esters are used as plasticizers mixed with a vinyl chloride-based resin, the reflectance of the radiative cooling layer CP does not decrease even when about 4 years elapses, but when trimellitic acid esters and epoxidized aliphatic acid esters are used as plasticizers mixed with the vinyl chloride-based resin, the reflectance of the radiative cooling layer CP significantly decreases before about 4 years elapses.

The test results described above show that excellent durability can be obtained with use of phthalic acid esters, aliphatic dibasic acid esters, phosphoric acid triesters, and aromatic phosphoric acid esters as plasticizers for the vinyl chloride-based resin, but sufficient durability cannot be obtained with use of trimellitic acid esters and epoxidized aliphatic acid esters.

Reasons for this will be considered and systematized later.

[Other Additives]

A flame retardant, a stabilizer, an auxiliary stabilizer, a filler, an antioxidant, an ultraviolet absorbing agent, and a photostabilizer may be added to the vinyl chloride-based resin forming the resin material layer J.

[Another Configuration of Radiative Cooling Layer]

Figure 16:
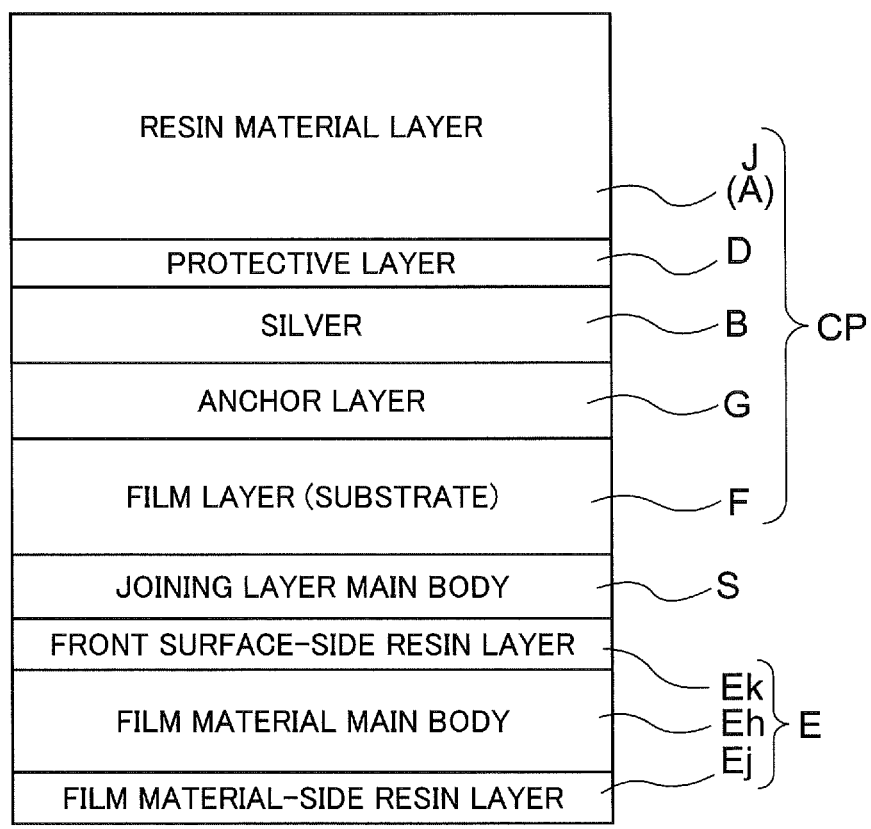
FIG. 16 is a diagram showing another configuration of a radiative cooling layer.

As shown in FIG. 16, the radiative cooling layer CP may include an anchor layer G on a film layer F (corresponding to a substrate), and the light reflective layer B, the protective layer D, and the infrared radiative layer A may be formed on the anchor layer G.

Note that the film layer F (corresponding to a substrate) is formed in a film shape from PET (ethylene terephthalate resin) or the like, for example.

The anchor layer is introduced to strengthen adhesion between the film layer F and the light reflective layer B. That is, when a silver (Ag) layer is directly formed on the film layer F, the silver layer may be easily peeled off. It is desirable that the anchor layer G contains an acrylic resin, a polyolefin, or urethane as a main component, and a compound that has an isocyanate group or a melamine resin is mixed therein. The anchor layer is a coating applied to a portion that is not directly irradiated with sunlight, and may be constituted by a material that absorbs ultraviolet rays.

Note that adhesion between the film layer F and the light reflective layer B can be strengthened with use of a method other than the method of introducing the anchor layer G. For example, when the surface of the film layer F, on which another layer is to be formed, is roughened by being irradiated with plasma, adhesion is strengthened.

[Consideration on Joining Layer]

In the case where the radiative cooling layer CP is attached to the outer surface of the film material E, it is preferable to set the thickness of the joining layer S to 5 μm or more and 100 μm or less.

In many cases, the outer surface (front surface) of the film material E is not a mirror surface. Countless scratches and irregularities in the order of several micrometers are often present in the outer surface (material front surface) of the film material E that is not a mirror surface.

If irregularities in the order of several micrometers present in the outer surface (material front surface) of the film material E are transferred to the light reflective layer B (silver layer) of the radiative cooling layer CP, the reflectance decreases.

Therefore, it is necessary to introduce a structure that prevents irregularities in the outer surface (material front surface) from affecting the radiative cooling layer CP. In this respect, it is preferable to join the radiative cooling layer CP to the outer surface of the film material E with use of the joining layer S having a thickness of about 5 μm or more and 100 μm or less.

When the joining layer S formed from an adhesive agent or a pressure-sensitive adhesive agent and having a thickness of 5 μm or more is provided, the joining layer S absorbs irregularities in the outer surface of the film material E, and the light reflective layer B (silver layer) of the radiative cooling layer CP is flat.

When the light reflective layer B (silver layer) is flat, a reduction in the reflectance for sunlight (in other words, an increase in the absorptivity for sunlight) can be prevented.

However, thermal insulation properties are improved when the thickness of the joining layer S is increased. If thermal insulation properties are improved, cold heat generated in the radiative cooling layer CP is insulated, which is not desirable. From this viewpoint, the joining layer S need not be excessively thick, and a thickness of 100 μm is sufficient.

[Joining of Radiative Cooling Film Materials]

In order to produce canvas that is used to form the upper surface portion and the side surface portion of the warehouse tent 1, a plurality of radiative cooling film materials W are joined.

Figure 17:
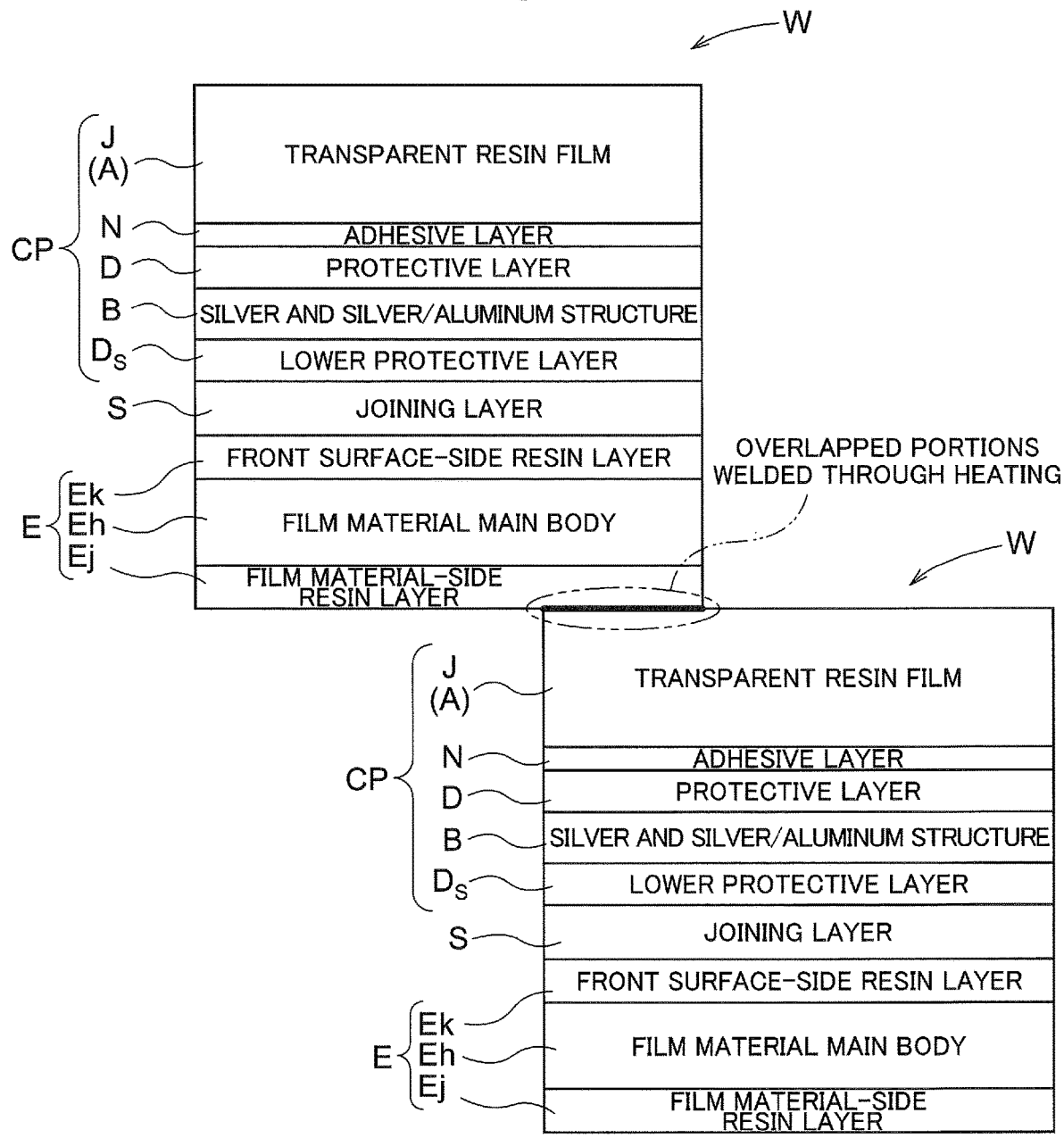
FIG. 17 is a diagram showing a joined state of radiative cooling film materials.

Each radiative cooling film material W includes: the resin material layer J (infrared radiative layer A) formed from a vinyl chloride resin or a vinylidene chloride resin on the front surface side; and the film material-side resin layer Ej formed from a vinyl chloride resin or a vinylidene chloride resin on the rear surface side. Accordingly, the plurality of radiative cooling film materials W are joined through thermal welding as shown in FIG. 17.

That is, in the production of canvas to be used for a tent or the like, edge portions of a plurality of radiative cooling film materials W that are formed as rectangular films are joined, for example. The radiative cooling film materials W can be joined through thermal welding, and therefore, the productivity of the canvas can be increased.

Examples of the thermal welding include high-frequency welding, hot-air welding, hot welding, and the like.

[Another Example of Radiative Cooling Film Material]

Figure 18:
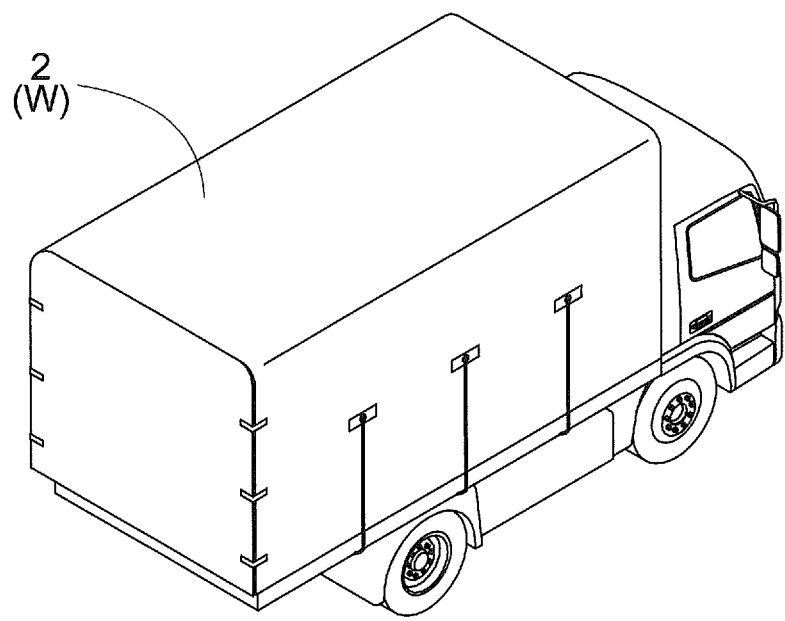
FIG. 18 is a diagram showing a truck equipped with a tarp.
Figure 19:
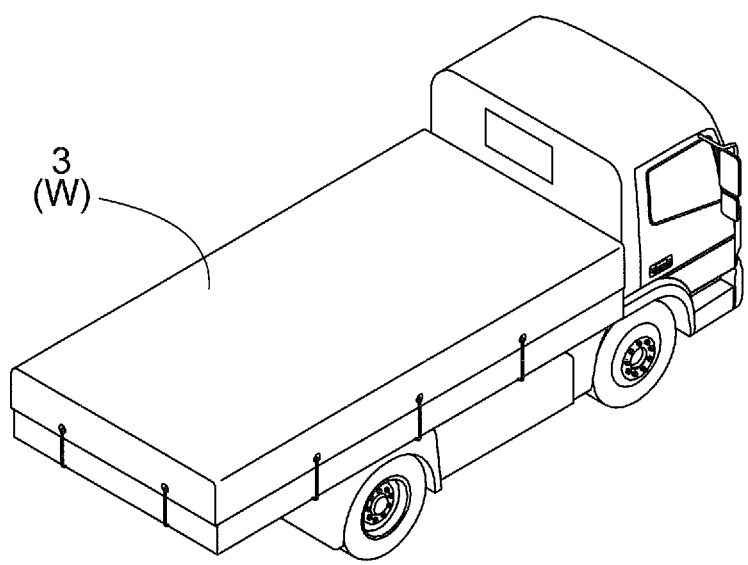
FIG. 19 is a diagram showing a truck equipped with a cargo bed sheet.

Canvas obtained by joining a plurality of radiative cooling film materials W can be used for various applications. That is, a tarp 2 of a truck shown in FIG. 18 can be formed from canvas obtained by joining a plurality of radiative cooling film materials W, and a cargo bed sheet 3 covering a cargo bed of a truck shown in FIG. 19 can be formed from canvas obtained by joining a plurality of radiative cooling film materials W.

Figure 20:
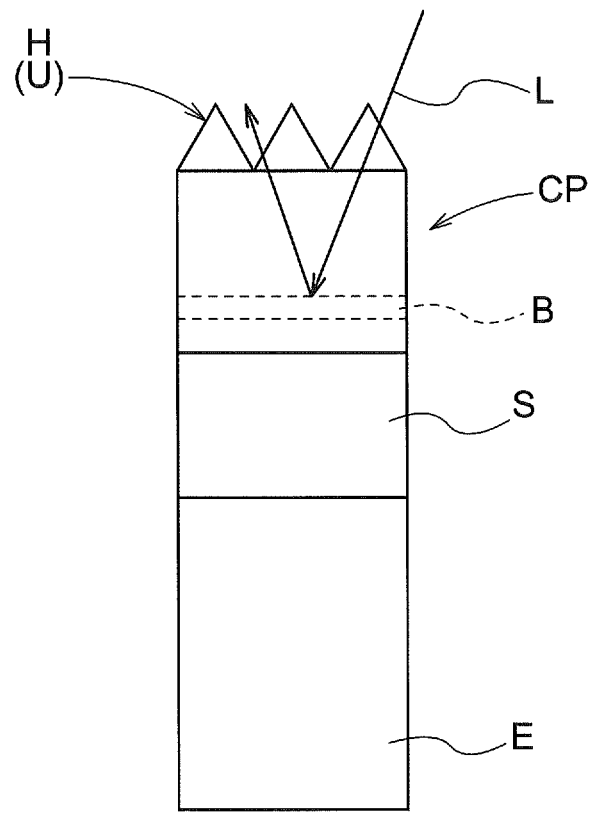
FIG. 20 is a diagram showing a configuration in which irregularities are formed in the radiative cooling layer.

In the case where the tarp 2 or the cargo bed sheet 3 of a truck is formed from canvas obtained by joining a plurality of radiative cooling film materials W, irregularities are preferably formed in the radiative surface H of the radiative cooling layer CP as shown in FIG. 20.

For example, protrusions U may be formed on the radiative surface H.

Figure 22:
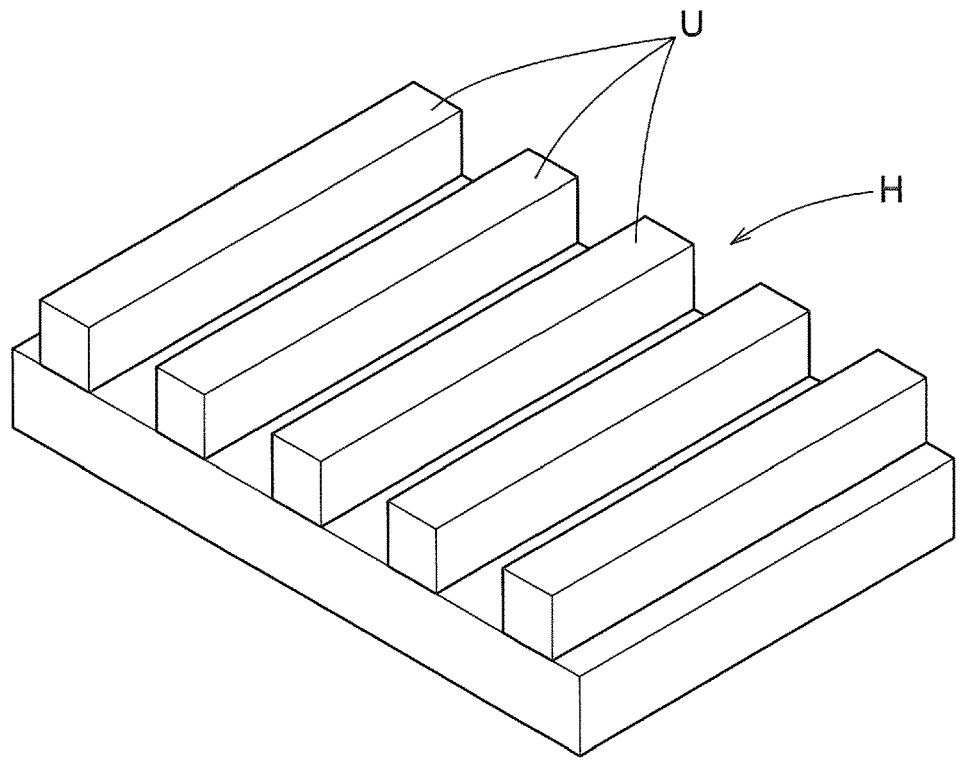
FIG. 22 is a diagram showing a specific example of irregularities in the radiative cooling layer.
Figure 23:
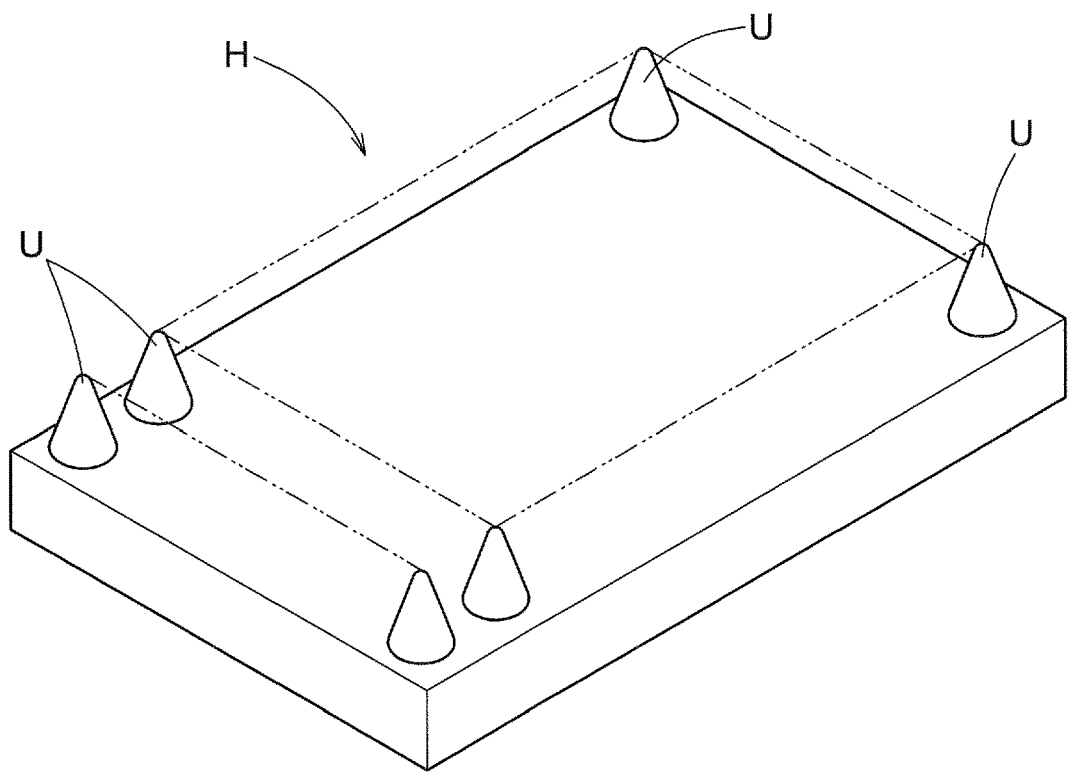
FIG. 23 is a diagram showing a specific example of irregularities in the radiative cooling layer.

Specific examples of such irregularities include various structures such as: a line-and-space structure (see FIG. 22) in which rectangular parallelepiped protrusions U are next to one another; a structure in which cone-shaped protrusions U are arranged in the longitudinal direction and the lateral direction (see FIG. 23); a structure in which triangular prism-shaped or pyramid-shaped protrusions U are arranged in the line-and-space arrangement (not shown); a structure in which cubic protrusions U are arranged in the longitudinal direction and the lateral direction (not shown); and a structure in which protrusions U are arranged at random (not shown).

Note that a height difference of irregularities formed in the radiative surface H is about 100 μm.

The following describes advantages of forming irregularities in the radiative surface H taking a truck equipped with the tarp 2 as an example.

Figure 21:
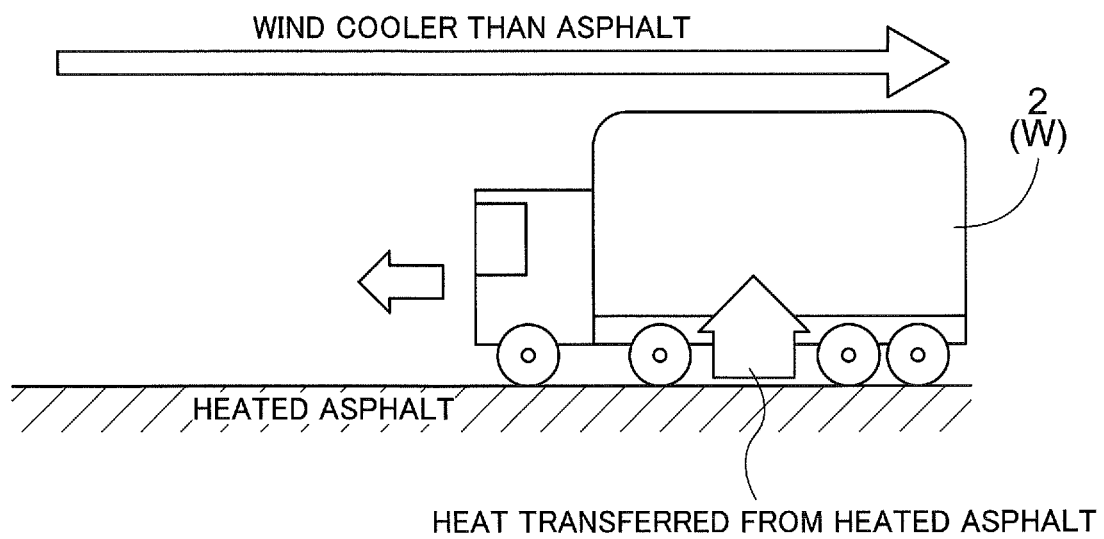
FIG. 21 is a diagram showing a state where a truck equipped with a tarp is traveling.

As shown in FIG. 21, heated asphalt is always under the truck during the day because the truck travels. Even if the film material E of the tarp 2 is covered with the radiative cooling layer CP, there is a risk of the temperature inside a container 8 becoming higher than the environmental temperature (ambient temperature) due to heat transferred from the heated asphalt or the like.

A traveling body is subjected to strong wind while traveling. The temperature of such wind is lower than the temperature inside the container heated by asphalt or the like, and it is desirable to introduce a design conceived by taking such heat exchange with wind (convection) during travel into account.

In summary, the following two types of heat are transferred to the inside of the tarp 2.

Heat transferred from sunlight.

Heat radiated from heated asphalt (the container is always directly above hot asphalt because the truck travels).

The temperature (temperature of the space) inside the tarp 2 may be higher than the environmental temperature (ambient temperature) under the influence of these two types of heat.

In the case where the tarp 2 is formed from the radiative cooling film material W, the radiative cooling layer CP serves to dissipate heat from the container 8, and therefore, the temperature inside the tarp 2 relatively decreases when compared with a case where another material such as solar reflective paint is applied. However, a large amount of heat is transferred from asphalt, and accordingly, the temperature inside the tarp 2 is likely to be higher than the environmental temperature (ambient temperature) during the day even though the radiative cooling layer CP is provided. If the temperature inside the tarp 2 is higher than the environmental temperature (ambient temperature), the outside air serves as a cold heat source, and it is desirable to enhance heat exchange with the outside air. In particular, a traveling body is subjected to strong wind while traveling, and accordingly, a structure that enhances heat exchange by receiving wind is introduced into the radiative cooling layer CP. That is, in order to enhance heat exchange with wind, it is desirable to increase the surface area by increasing surface roughness.

From this viewpoint, it is desirable to form irregularities in the infrared radiative layer A of the radiative cooling layer CP through embossing processing or the like as shown in FIG. 20 to increase the surface area.

That is, this structure is preferably introduced in a case where there is a heat source other than sunlight and a heated atmosphere, the temperature of the film material E, on which the radiative cooling layer CP is attached, exceeds the environmental temperature (ambient temperature), and the environmental temperature (ambient temperature) serves as cold heat.

Forming irregularities in the radiative surface H is also advantageous in terms of appearance. When compared with a case where the radiative surface H (upper surface) of the radiative cooling layer CP is a mirror surface, sunlight is more scattered in the case where irregularities are formed in the radiative surface H, and therefore, glare on the radiative cooling layer CP is suppressed. When glare on the radiative cooling layer CP is suppressed, visibility is increased, and consequently safety during travel is increased.

Note that, even if a light scattering function is imparted to the radiative surface H, light absorption by silver (silver alloy) included in the light reflective layer B does not increase, and accordingly, radiative cooling can be favorably performed.

[Other Configurations of Radiative Cooling Layer]

Figure 24:
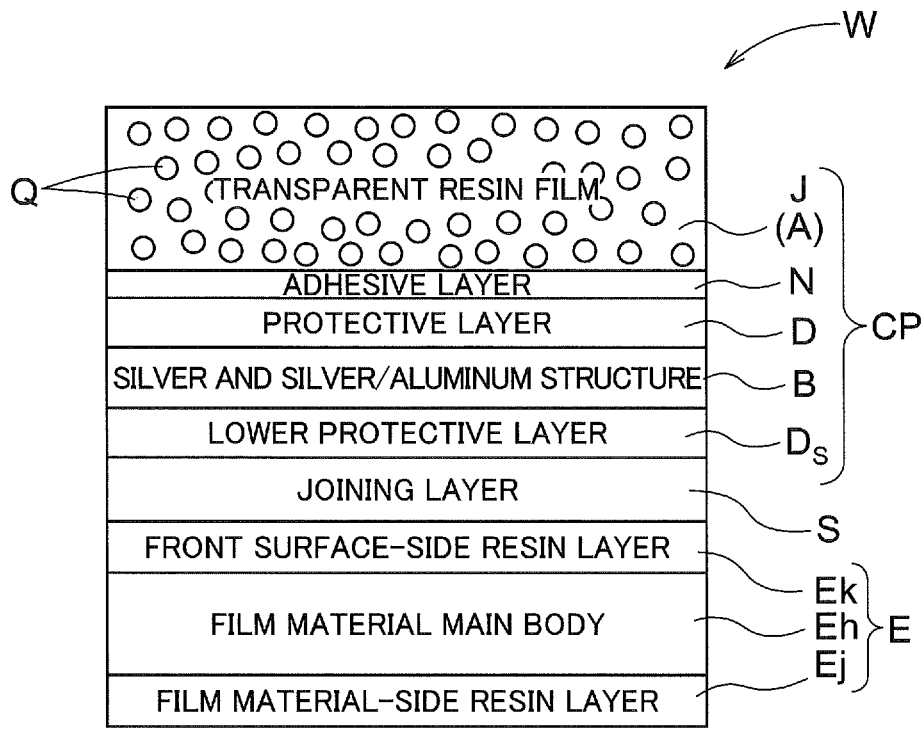
FIG. 24 is a diagram showing a configuration in which a filler is mixed in a resin material layer.
Figure 25:
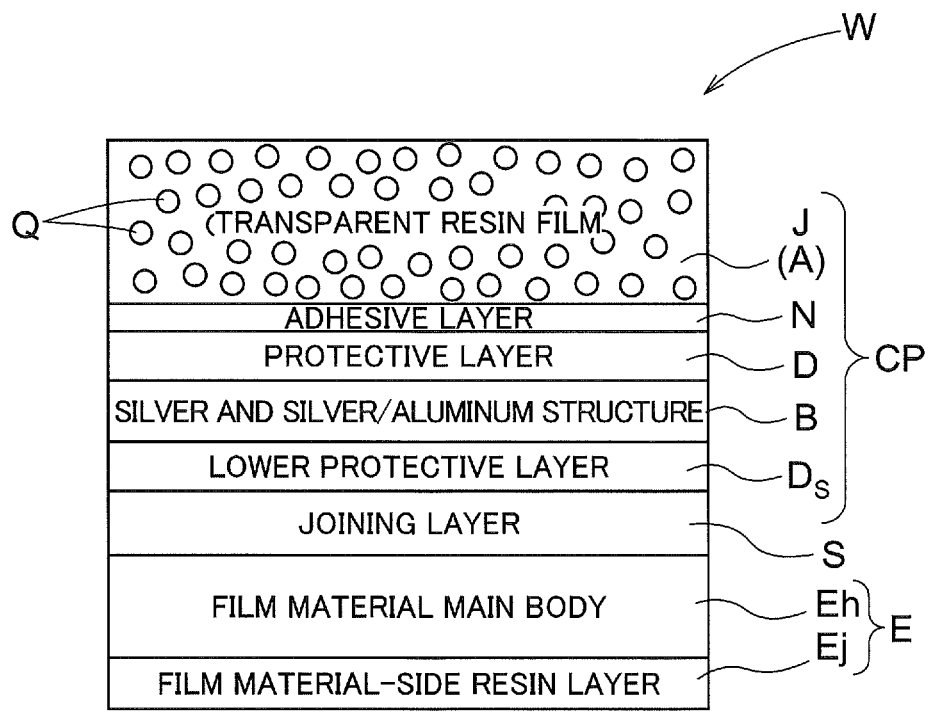
FIG. 25 is a diagram showing a configuration in which a filler is mixed in the resin material layer.

As shown in FIGS. 24 and 25, it is possible to provide the resin material layer J constituting the infrared radiative layer A with a light scattering configuration by mixing a filler Q made of an inorganic material therein.

Figure 26:
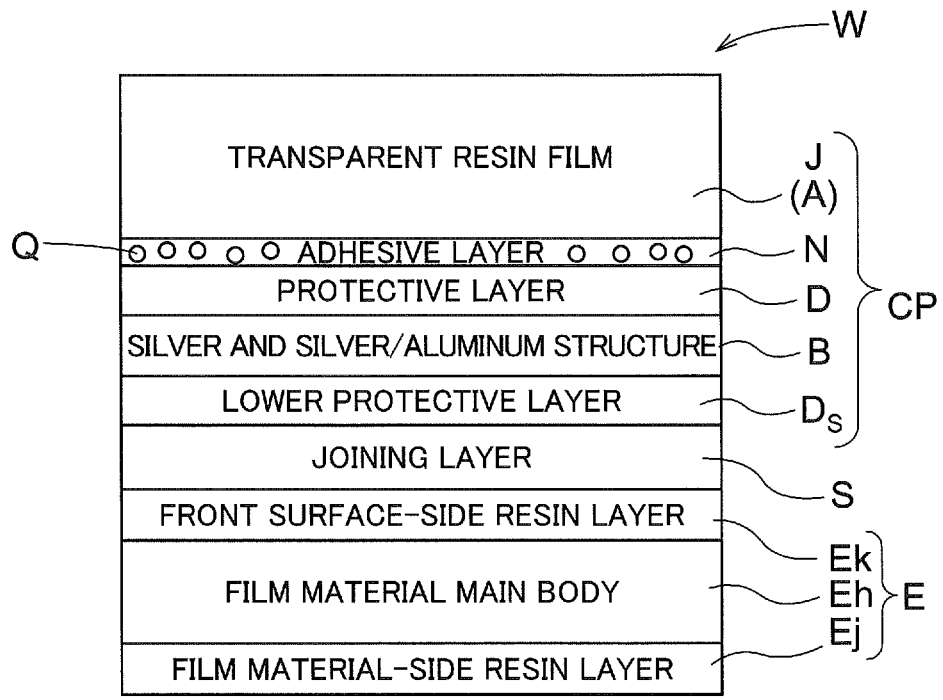
FIG. 26 is a diagram showing a configuration in which a filler is mixed in an adhesive layer.
Figure 27:
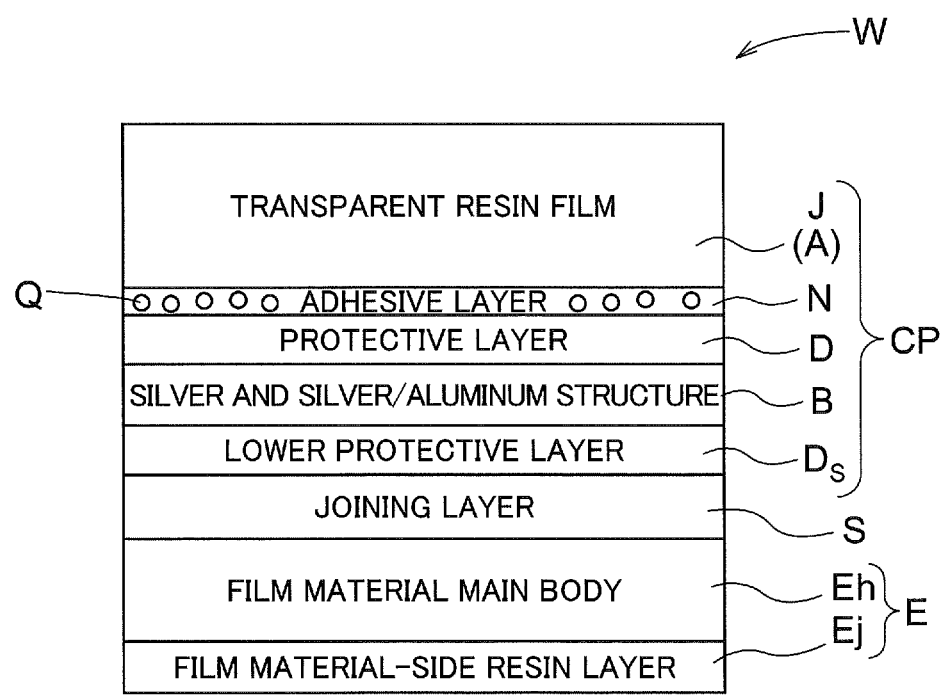
FIG. 27 is a diagram showing a configuration in which a filler is mixed in the adhesive layer.

Alternatively, in cases where an adhesive layer N that joins the resin material layer J to the protective layer D is provided between the resin material layer J and the protective layer D as shown in FIGS. 26 and 27, it is possible to provide the adhesive layer N with a light scattering configuration by mixing a filler Q made of an inorganic material therein.

A urethane adhesive agent, a urethane pressure-sensitive adhesive agent, an acrylic adhesive agent, an acrylic pressure-sensitive adhesive agent, an ethylene vinyl acetate adhesive agent, an ethylene vinyl acetate pressure-sensitive adhesive agent, or the like can be preferably used to form the adhesive layer.

That is, examples of an adhesive agent (pressure-sensitive adhesive agent) used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and an adhesive agent (pressure-sensitive adhesive agent) that is highly transparent to sunlight is used.

Note that the adhesive layer N has a thickness of about 10 µm, for example.

Note that the radiative cooling film materials W shown in FIGS. 24 to 27 have configurations similar to that of the radiative cooling film material W shown in FIG. 8, but in the case where the inorganic filler Q is mixed in the resin material layer J, it is possible to adopt the configurations of the radiative cooling film materials W shown in FIGS. 6, 7, and 9.

In the case where the inorganic filler Q is mixed in the resin material layer J, the inorganic filler Q mixed in the transparent resin material layer J is visible when the radiative cooling layer CP is viewed from the radiative surface H side, and accordingly, the radiative cooling film material W appears white as viewed from the radiative surface H side due to a light scattering effect of the inorganic filler Q, and the appearance of the radiative cooling film material W can be improved.

Also, in the case where the inorganic filler Q is mixed in the adhesive layer N, which joins the resin material layer J to the protective layer D, the inorganic filler Q mixed in the adhesive layer N is visible through the transparent resin material layer J when the radiative cooling layer CP is viewed from the radiative surface H side. Therefore, the radiative cooling film material W appears white as viewed from the radiative surface H side due to the light scattering effect of the inorganic filler Q, and the appearance of the radiative cooling film material W can be improved.

Note that the filler Q may be mixed in both the resin material layer J and the adhesive layer N.

Inorganic materials such as silicon dioxide ($SiO_2$), titanium oxide ($TiO_2$), aluminum oxide ($Al_2O_3$), magnesium oxide (MgO), and calcium carbonate ($CaCO_3$) can be preferably used as the filler Q.

In particular, particles of titanium oxide ($TiO_2$) that do not exhibit photocatalytic activity and have a size of about 200 nm can be preferably used.

Also, the titanium oxide ($TiO_2$) may be provided with at least one of an alumina coating, a silica coating, and a zirconia coating. This configuration is advantageous in appropriately keeping the filler from exhibiting photocatalytic activity and suppressing deterioration of the resin material layer J.

Note that when the filler Q is mixed in the resin material layer J, irregularities are formed in both front and rear surfaces of the resin material layer J.

In the case where irregularities are formed in the rear surface of the resin material layer J, it is desirable to provide the adhesive layer N between the resin material layer J and the protective layer D.

That is, even if there are irregularities in the rear surface of the resin material layer J, it is possible to appropriately join the resin material layer J to the protective layer D due to the adhesive layer N (joining layer) between the resin material layer J and the protective layer D.

Note that in the case where there are irregularities in the rear surface of the resin material layer J, it is also possible to directly join the resin material layer J to the protective layer D through plasma bonding, for example. In the plasma bonding, radicals are formed on joining surfaces of the resin material layer J and the protective layer D by emitting plasma toward these surfaces, and the surfaces are bonded by the radicals.

[Mixing of Filler in Protective Layer]

When the filler Q is mixed in the protective layer D, irregularities are formed in the rear surface of the protective layer D that comes into contact with the light reflective layer B, and consequently irregularities are formed in the surface of the light reflective layer B, and therefore, the filler Q needs to be kept from being mixed in the protective layer D. That is, when irregularities are formed in the surface of the light reflective layer B, the light reflective layer B cannot reflect light appropriately, and consequently, radiative cooling cannot be performed appropriately.

In this regard, an experimental result will be described based on FIG. 28.

Figure 28:
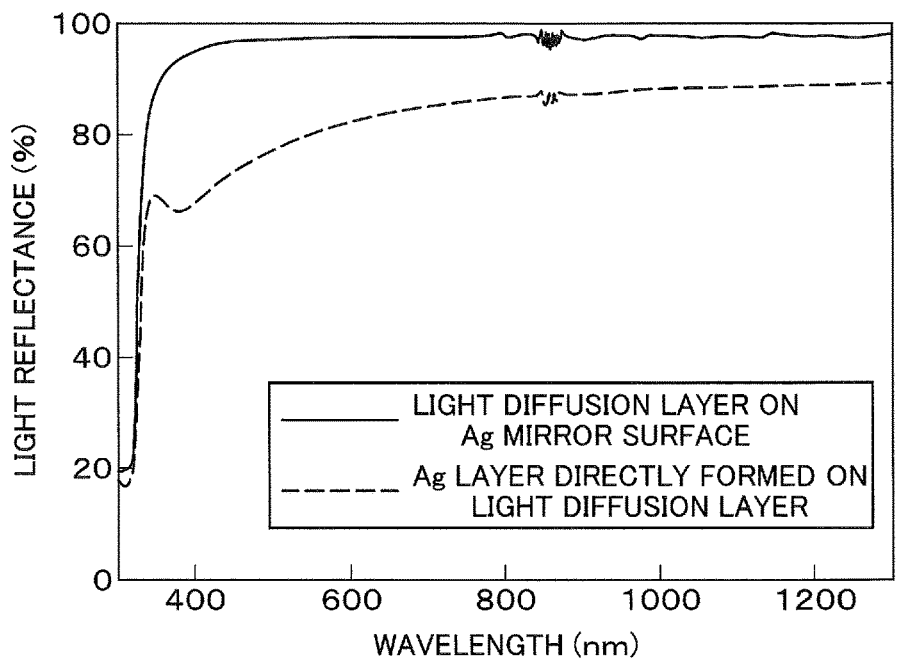
FIG. 28 is a graph showing an experimental result.

In FIG. 28, "Ag layer directly formed on light diffusion layer" means that the light reflective layer B was formed from silver (Ag) through vapor deposition or the like on a surface of the infrared radiative layer A (resin material layer J) in which the filler Q was mixed or irregularities were formed through embossing processing in a surface facing the Ag layer, i.e., the light reflective layer B.

Also, "light diffusion layer on Ag mirror surface" means that the upper surface of the Ag layer, i.e., the light reflective layer B, was formed into a mirror surface, and the protective layer D and the infrared radiative layer A (resin material layer J) in which the filler Q was mixed or irregularities were formed through embossing processing were stacked on the Ag layer.

As shown in FIG. 28, in the case of "Ag layer directly formed on light diffusion layer", irregularities were formed in a surface of the light reflective layer B, and therefore, the light reflectance significantly decreased, but in the case of "light diffusion layer on Ag mirror surface", the mirror surface of the light reflective layer B was maintained and an appropriate reflectance was obtained.

[Another Configuration of Infrared Radiative Layer]

Figure 29:
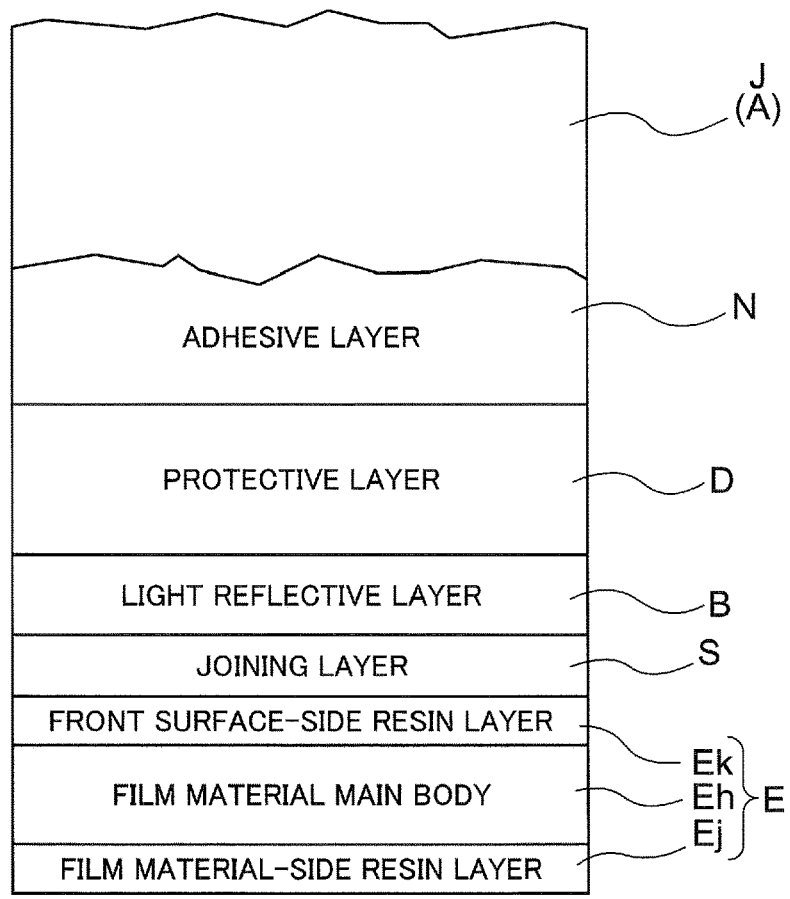
FIG. 29 is a diagram showing a configuration in which irregularities are formed in front and rear surfaces of the resin material layer.

As shown in FIG. 29, irregularities may be formed in front and rear surfaces of the resin material layer J constituting the infrared radiative layer A to provide a light scattering configuration.

With this configuration, it is possible to suppress glare on the radiative surface H when the radiative surface H is seen.

That is, front and rear surfaces of the resin material layer J of the radiative cooling layers CP shown in FIGS. 6 to 9 are both flat and a filler Q is not mixed in the resin material layer J. In this case, the radiative surface H is a mirror surface and there is glare when the radiative surface H is seen, but the glare can be suppressed with the light scattering configuration.

Irregularities can be formed in both of the front and rear surfaces of the resin material layer J through embossing processing or processing for scratching the surfaces, for example.

When the adhesive layer N is provided between the resin material layer J and the protective layer D, the resin material layer J and the protective layer D can be joined appropriately even if the rear surface of the resin material layer J has irregularities.

Other Embodiments

Other embodiments are listed below.
(1) In the above embodiment, an example in which the protective layer D is provided is described, but the protective layer D may be omitted.
(2) In the above embodiment, an example in which canvas obtained by joining a plurality of radiative cooling film materials W is used for the warehouse tent 1, the tarp 2 of a truck, or the cargo bed sheet 3 is described, but the canvas can also be applied to tents and the like used for various purposes, such as a camp tent and a sunshade tarp.

The configurations disclosed in the above embodiments (including the other embodiments, the same applies hereinafter) can be applied in combination with configurations disclosed in other embodiments so long as no contradiction arises. Also, the embodiments disclosed in the present specification are examples, and embodiments of the present invention are not limited to the disclosed embodiments, and can be modified as appropriate within a range not deviating from the object of the present invention.

DESCRIPTION OF REFERENCE SIGNS

A: Infrared radiative layer
B: Light reflective layer
D: Protective layer
E: Film material
Eh: Film material main body
Ej: Film material-side resin layer
H: Radiative surface
J: Resin material layer
Q: Filler

The invention claimed is:

1. A radiative cooling film material comprising:
   a film material; and
   a radiative cooling layer on an outer surface of the film material,
   wherein the radiative cooling layer comprises:
      an infrared radiative layer having a radiative surface for radiating infrared light; and
      a light reflective layer on a side of the infrared radiative layer, which is opposite to the radiative surface, and
   wherein:
   the infrared radiative layer is a resin material layer comprising a vinyl chloride resin or a vinylidene chloride resin and having a thickness adjusted so that the resin material layer emits heat radiation energy greater than absorbed solar energy in a wavelength range from 8 μm to 14 μm,
   the light reflective layer comprises silver or a silver alloy, and
   the radiative cooling film material further comprises a film material-side resin layer comprises a vinyl chloride resin or a vinylidene chloride resin and serving as a rear surface portion of the film material, and
   the rear surface portion is apart from the radiative cooling layer.

2. The radiative cooling film material according to claim 1,
   wherein the radiative cooling layer is attached to the outer surface of the film material via a joining layer comprising an adhesive agent or a pressure-sensitive adhesive agent.

3. The radiative cooling film material according to claim 1,
   wherein the thickness of the resin material layer is adjusted so that the resin material layer has:
      light absorption properties that allow for a wavelength average absorptivity of 13% or less in a wavelength range from 0.4 μm to 0.5 μm, a wavelength average absorptivity of 4% or less in a wavelength range from 0.5 μm to 0.8 μm, a wavelength average absorptivity of 1% or less in a wavelength range from 0.8 μm to 1.5 μm, and a wavelength average absorptivity of 40% or less in a wavelength range from 1.5 μm to 2.5 μm; and
      heat radiation properties that allow for a wavelength average emissivity of 40% or more in the wavelength range from 8 μm to 14 μm.

4. The radiative cooling film material according to claim 1,
   wherein the light reflective layer has a reflectance of 90% or more in a wavelength range from 0.4 μm to 0.5 μm, and a reflectance of 96% or more with respect to light having a wavelength longer than 0.5 μm.

5. The radiative cooling film material according to claim 1,
   wherein the light reflective layer comprises silver or a silver alloy and has a thickness of 50 nm or more.

6. The radiative cooling film material according to claim 1,
   wherein the light reflective layer has a layered structure comprising (i) silver or a silver alloy adjacent to the resin material layer and (ii) aluminum or an aluminum alloy apart from the resin material layer.

7. The radiative cooling film material according to claim 1,
   wherein the resin material layer comprises a vinyl chloride resin or a vinylidene chloride resin as a resin material in which a plasticizer is mixed, and
   wherein the plasticizer is at least one compound selected from the group consisting of phthalic acid esters, aliphatic dibasic acid esters, and phosphoric acid esters.

8. The radiative cooling film material according to claim 7,
   wherein the plasticizer is mixed in an amount of 1 part by weight or more and 200 parts by weight or less relative to 100 parts by weight of the vinyl chloride resin or the vinylidene chloride resin.

9. The radiative cooling film material according to claim 7,
   wherein the plasticizer comprises a phosphoric acid ester that is a phosphoric acid triester or an aromatic phosphoric acid ester.

10. The radiative cooling film material according to claim 1, further comprising:
    a protective layer between the resin material layer and the light reflective layer, and
    wherein the protective layer comprises a polyolefin resin and has a thickness of 300 nm or more and 40 μm or less, or comprises a polyethylene terephthalate resin and has a thickness of 17 μm or more and 40 μm or less.

11. The radiative cooling film material according to claim 10, further comprising:
    an adhesive layer between the resin material layer and the protective layer, the adhesive layer joining the resin material layer to the protective layer.

12. The radiative cooling film material according to claim 11,
    wherein the adhesive layer comprises a urethane adhesive agent, a urethane pressure-sensitive adhesive agent, an acrylic adhesive agent, an acrylic pressure-sensitive adhesive agent, an ethylene vinyl acetate adhesive agent, or an ethylene vinyl acetate pressure-sensitive adhesive agent.

13. The radiative cooling film material according to claim 1, wherein the resin material layer comprises a filler made of an inorganic material.

14. The radiative cooling film material according to claim 11, wherein the adhesive layer comprises a filler made of an inorganic material.

15. The radiative cooling film material according to claim 14, wherein the filler is included in an amount of 0.1 to 40 wt % relative to the adhesive layer.

16. The radiative cooling film material according to claim 13, wherein the filler comprises any one selected from the group consisting of silicon dioxide, titanium oxide, aluminum oxide, magnesium oxide, and calcium carbonate.

17. The radiative cooling film material according to claim 13, wherein the filler comprises titanium oxide.

18. The radiative cooling film material according to claim 17, wherein the titanium oxide is provided with at least one of an alumina coating, a silica coating, and a zirconia coating.

19. The radiative cooling film material according to claim 1, wherein the radiative surface has irregularities.

* * * * *